(12) United States Patent
Harpaz et al.

(10) Patent No.: US 10,334,067 B2
(45) Date of Patent: Jun. 25, 2019

(54) MQTT CLUSTER SHARED SUBSCRIPTION HUB FOR FAT-PIPE CLOUD APPLICATIONS

(71) Applicant: International Business Machines Corporation, Armonk, NY (US)

(72) Inventors: Avraham Harpaz, Haifa (IL); Nir Naaman, Haifa (IL); Yoav Tock, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 15/396,691

(22) Filed: Jan. 2, 2017

(65) Prior Publication Data

US 2018/0191813 A1    Jul. 5, 2018

(51) Int. Cl.
    *G06F 15/16*      (2006.01)
    *H04L 29/08*      (2006.01)

(52) U.S. Cl.
    CPC .......... *H04L 67/26* (2013.01); *H04L 67/1023* (2013.01)

(58) Field of Classification Search
    CPC ............................ H04L 67/26; H04L 67/1023
    USPC .................................................. 709/204, 203
    See application file for complete search history.

(56) References Cited

U.S. PATENT DOCUMENTS

| | | | |
|---|---|---|---|
| 6,336,119 B1* | 1/2002 | Banavar | G06F 17/30961 |
| 7,831,600 B2 | 11/2010 | Kilian | |
| 2005/0210109 A1 | 9/2005 | Brown et al. | |
| 2010/0322236 A1 | 12/2010 | Vimpari et al. | |
| 2011/0137950 A1* | 6/2011 | Deng | G06Q 30/02 707/794 |
| 2014/0244768 A1* | 8/2014 | Shuman | H04W 4/70 709/206 |
| 2015/0207857 A1* | 7/2015 | Horton | H04L 67/16 709/204 |

(Continued)

OTHER PUBLICATIONS

"MQTT Client Load Balancing with Shared Subscriptions", HiveMQ Enterprise MTQQ Broker, 2016, Can be found at: http://www.hivemq.com/blog/mqtt-client-load-balancing-with-shared-subscriptions/.

(Continued)

*Primary Examiner* — Philip B Tran
(74) *Attorney, Agent, or Firm* — G.E Eherlich

(57) ABSTRACT

A computer implemented method of improving server coverage of a publish-subscribe cluster comprising using one or more hardware processors to execute one or more shared subscriptions hubs each adapted to retrieve shared subscriptions information from a cluster comprising multiple servers executing multiple messaging engines of a publish-subscribe service for forwarding messages to a plurality of subscribing clients, each message is associated with one or more of a plurality of topics, receive shared subscriptions requests for subscribing for one or more of the topics from distributed subscriptions client(s) applying shared subscriptions for the topic(s) through subscription group(s) comprising a subset of the subscribing clients, connect to preferred messaging engine(s) selected to improve server coverage of the subscription group(s) according to the shared subscriptions information to serve each of the plurality of shared subscriptions requests and forward messages associated with the topic(s) received from the selected messaging engine(s) to the subscription group(s).

20 Claims, 9 Drawing Sheets

(56) References Cited

U.S. PATENT DOCUMENTS

| | | | |
|---|---|---|---|
| 2016/0087854 A1* | 3/2016 | Jayanti Venkata | G06F 8/60 709/224 |
| 2016/0105385 A1* | 4/2016 | Allen | G06F 17/30327 709/206 |
| 2017/0339238 A1* | 11/2017 | Qin | H04L 67/26 |
| 2018/0167476 A1* | 6/2018 | Hoffner | H04L 67/26 |
| 2018/0255146 A1* | 9/2018 | Aston | H04L 67/141 |

OTHER PUBLICATIONS

Emiliano Casalicchio et al., "Distributed subscriptions clustering with limited knowledge sharing for content-based publish/subscribe systems", Sixth IEEE International Symposium on Network Computing and Applications (NCA 2007) Date of Conference: Jul. 12-14, 2007.

* cited by examiner

MQTT CLUSTER SHARED SUBSCRIPTION HUB FOR FAT-PIPE CLOUD APPLICATIONS

RELATED APPLICATION

This application is related to co-filed, co-pending and co-assigned U.S. patent application entitled "CLUSTER ASSISTED MQTT SERVER COVERAGE FOR FAT-PIPE CLOUD APPLICATIONS" by Yoav TOCK, Nir NAAMAN, and Avraham HARPAZ, the contents of which are incorporated herein by reference in their entirety.

FIELD AND BACKGROUND OF THE INVENTION

The present invention, in some embodiments thereof, relates to a publish-subscribe service and, more particularly, but not exclusively, to applying shared subscription hubs for intermediating delivery of messages to shared subscriptions clients.

Publish-subscribe is a popular communication paradigm allowing users that produce and consume messages to interact with each other in a decoupled fashion. A typical implementation of this paradigm is topic-based publish-subscribe in which the messages are classified according to topics. In the topic-based publish-subscribe, message producers, also called "publishers" (publishing clients), publish their messages on logical channels called "topics". Message consumers, also called "subscribers" (subscribing clients), subscribe to the topics that are of interest to them, and receive messages published on those topics of choice. Publishers and subscribers are decoupled because they don't need to know the network address of one another, only the topic identifier on top of which they communicate.

Due to its simple interface and inherent scalability, publish-subscribe is commonly used to support many-to-many communication in a wide variety of popular Internet applications, such as, for example, enterprise application integration, stock-market monitoring engines, RSS feeds, on-line gaming and/or the like. There are numerous implementations of the publish-subscribe middleware in both industry, for example, IBM® WebSphere Message Queue (IBM-WMQ), IBM® MessageSight (IBMMS), RabitMQ, Apache Kafka and academia, for example, Corona.

One publish-subscribe protocol in wide use may be, for example, the Message Queue Telemetry Transport (MQTT) used mainly for the "Internet of Things" (IoT) and Machine-to-Machine (M2M) applications. Another popular publish-subscribe protocol is the Java Messaging Service (JMS) which is used mainly for enterprise application integration and/or the like.

SUMMARY OF THE INVENTION

According to an aspect of some embodiments of the present invention there is provided a computer implemented method of improving server coverage of a publish-subscribe cluster using shared subscriptions hubs for intermediating shared subscription clients subscribing to the cluster, comprising using one or more hardware processor to execute one or more shared subscriptions hub, each adapted to:

Retrieve a shared subscriptions information from a cluster comprising a plurality of servers executing a plurality of messaging engines of a publish-subscribe service for forwarding a plurality of messages to a plurality of subscribing clients. Each of the plurality of messages is associated with one of a plurality of topics.

Receive a plurality of shared subscriptions requests for subscribing for one or more of the plurality of topics from one or more distributed subscriptions clients applying shared subscriptions for the one or more topic through one or more subscription groups each comprising a subset of the plurality of subscribing clients.

Connect to one or more preferred messaging engines of the plurality of messaging engines selected according to the shared subscriptions information to serve each of the plurality of shared subscriptions requests.

Forward messages associated with the one or more topics received from the one or more selected messaging engines to the one or more subscription groups.

Wherein the one or more preferred messaging engines are selected to improve a server coverage of the one or more subscription groups.

According to some embodiments of the invention, each of the plurality of messages is received by the cluster from one or more sources, for example, a device, a publishing application and/or the like.

According to some embodiments of the invention, the one or more distributed subscriptions clients subscribes to the publish-subscribe service through the one or more subscription groups to increase a message consumption of the one or more distributed subscriptions clients.

According to some embodiments of the invention, the one or more distributed subscriptions clients is a fat pipe application consuming a large number of the plurality of messages.

According to some embodiments of the invention, each subscribing client of the one or more subscription groups is an application instance of the one or more distributed subscriptions clients.

According to some embodiments of the invention, the publish-subscribe service supports subscription using a wildcard topic filter in which only a portion of one or more of the topic may be used by one or more of the subscribing clients to subscribe to a plurality of topics sharing the portion.

According to some embodiments of the invention, the one or more shared subscriptions hubs emulates a functional interface of the publish-subscribe cluster to allow each of the plurality of subscribing clients to subscribe to the one or more shared subscriptions hubs.

According to some embodiments of the invention, the one or more shared subscriptions hubs uses a functional interface used by each the plurality of subscribing clients to connect to the one or more selected messaging engines.

According to some embodiments of the invention, the publish-subscribe service is an MQTT (Message Queue Telemetry Transport) used for a plurality of Internet of Things (IoT) applications.

According to some embodiments of the invention, the shared subscriptions information comprises at least one of:

Cluster membership information indicating which of the plurality of servers is a member of the cluster.

Sub-name subscription information indicating a number of current subscriptions of each of the one or more subscription groups to each of the plurality of messaging engines for each of the plurality of topics.

Application identification information indicating an application name of the one or more distributed subscriptions clients.

According to some embodiments of the invention, the one or more shared subscriptions hubs is configured in one or more of a plurality of configurations for serving the plurality of subscribing clients, in particular the one or more subscription groups. The configuration is a member of a group consisting of: a private shared subscriptions hub, a dedicated shared subscriptions hub, a central shared subscriptions hub and a combination of at least two configurations thereof.

According to some embodiments of the invention, the private shared subscriptions is assigned to serve privately each of the plurality of clients.

According to some embodiments of the invention, the dedicated shared subscriptions hub is assigned to serve exclusively each of the one or more subscription groups.

According to some embodiments of the invention, the central shared subscriptions hub is assigned to serve at least a subset of the plurality of subscribing clients regardless of their association with the one or more subscription groups.

Optionally, according to some embodiments of the invention, the one or more shared subscriptions hubs establish one or more additional subscription connections for one or more clients of the one or more subscription groups with one or more of the messaging engines. Wherein the one or more shared subscriptions hubs establish the one or more additional subscription connections in case a number of clients of each of the one or more shared subscription group is smaller than a number of the plurality of servers that are members of the cluster.

Optionally, according to some embodiments of the invention, the one or more shared subscriptions hubs multiplex messages received through the one or more additional subscription connections with a message stream received thorough one or more originally directed subscription connections of the respective one of the subscription groups.

According to an aspect of some embodiments of the present invention there is provided a publish-subscribe system, comprising:

A cluster comprising a plurality of servers executing a plurality of messaging engines of a publish-subscribe service for forwarding a plurality of messages to a plurality of subscribing clients. Each of the plurality of messages is associated with one or more of the plurality of topics.

One or more hardware processors adapted for executing one or more shared subscriptions hubs by executing code stored in a program store, the code comprising:

Code instructions for retrieving a shared subscriptions information from the cluster.

Code instructions for receiving a plurality of shared subscription requests for subscribing for one or more of the plurality of topics from one or more distributed subscriptions clients applying shared subscriptions for the one or more topics through one or more subscription groups each comprising a subset of the plurality of subscribing clients.

Code instructions for connecting to one or more preferred messaging engines of the plurality of messaging engines selected according to the shared subscriptions to serve each of the plurality of shared subscriptions requests.

Code instructions for forwarding messages associated with the one or more topics received from the one or more selected messaging engines to the one or more subscription groups.

Wherein the one or more preferred messaging engines are selected to improve a server coverage of the one or more subscription groups.

According to an aspect of some embodiments of the present invention there is provided a computer program product for improving server coverage of a publish-subscribe cluster using shared subscriptions hubs for intermediating shared subscription clients subscribing to the cluster, comprising:

A non-transitory computer readable storage medium;

First program instructions to retrieve a shared subscriptions information from a cluster comprising a plurality of servers executing a plurality of messaging engines of a publish-subscribe service for forwarding a plurality of messages to a plurality of subscribing clients. Each of the plurality of messages is associated with one or more of a plurality of topics.

Second program instructions to receive a plurality of shared subscription requests for one or more of the plurality of topics from one or more distributed subscriptions clients applying shared subscriptions through one or more subscription groups each comprising a subset of the plurality of subscribing clients.

Third program instructions to connect to one or more preferred messaging engines of the plurality of messaging engines selected according to the shared subscriptions information to serve each of the plurality of shared subscriptions requests.

Fourth program instructions to forward messages associated with the one or more topics received from the one or more selected messaging engines to the one or more subscription groups.

Wherein the one or more preferred messaging engines are selected to improve a server coverage of the one or more subscription groups. Wherein said first, second, third and fourth program instructions are executed by one or more processors from the non-transitory computer readable storage medium.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a flowchart of an exemplary process for applying shared subscription hubs to intermediate delivery of messages to a plurality of shared subscription clients, according to some embodiments of the present invention; and FIG. 2 is a schematic illustration of an exemplary system for applying shared subscription hubs to intermediate delivery of messages to a plurality of shared subscription clients, according to some embodiments of the present invention;

Figure 6:
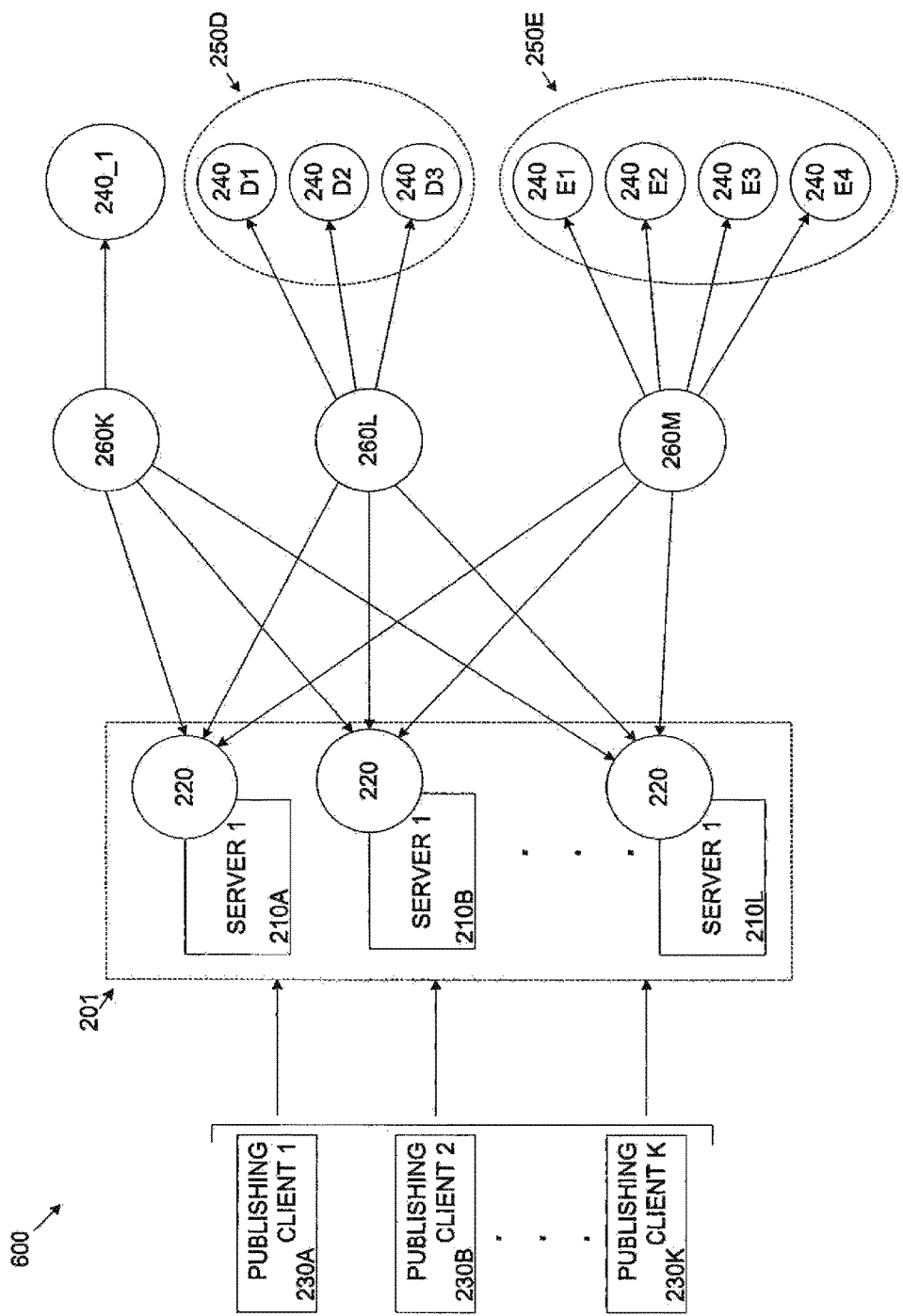
Figure 7A:
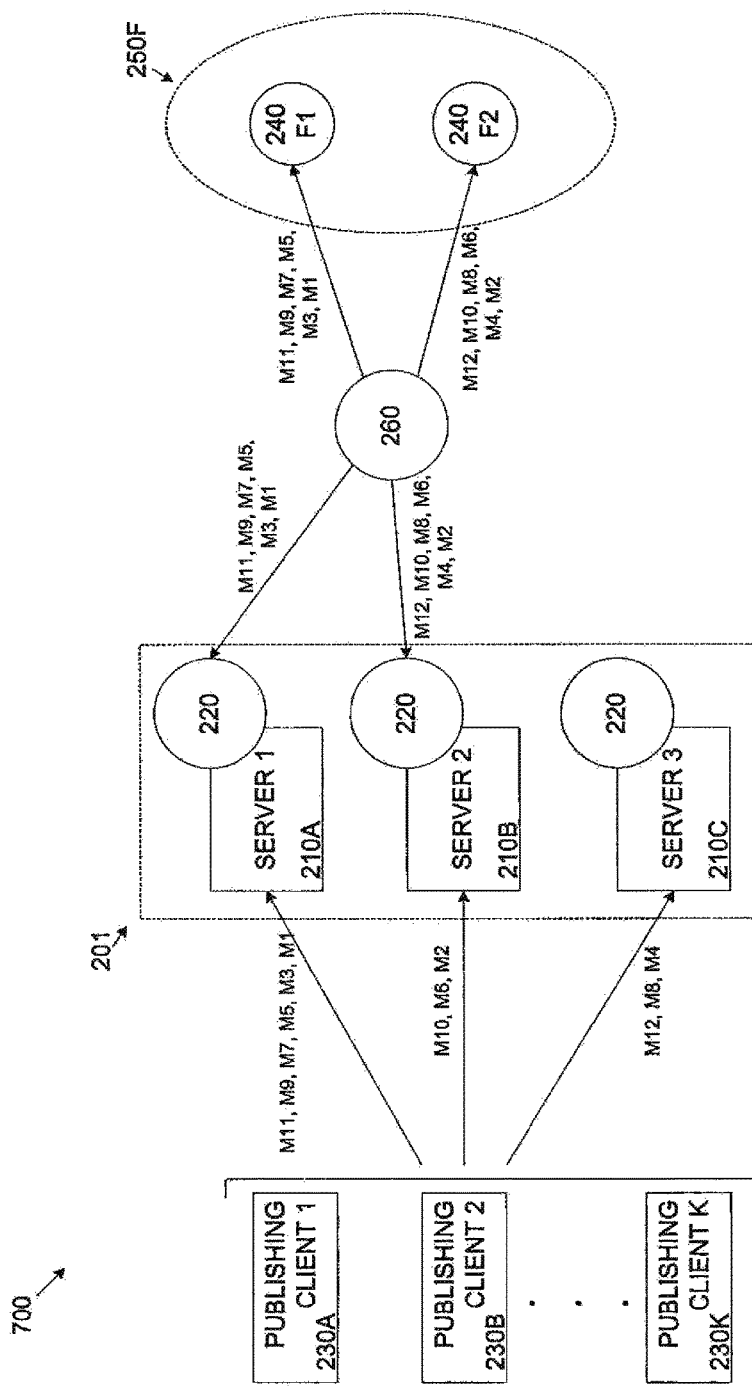
Figure 7B:
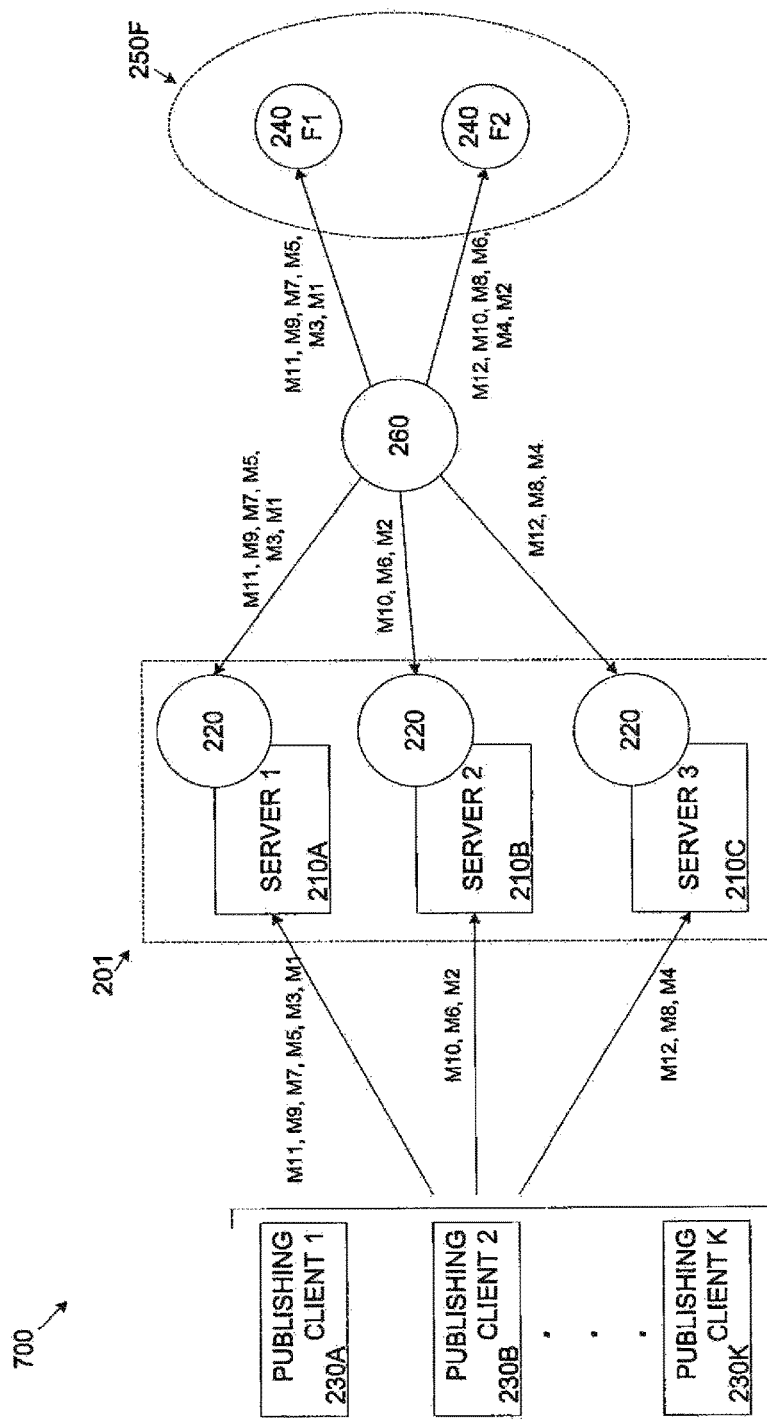

FIG. 6 is a schematic illustration of an exemplary system for applying dedicated shared subscription hubs to intermediate delivery of messages to a plurality of shared subscription clients, according to some embodiments of the present invention; and FIG. 7A and FIG. 7B are schematic illustrations of an exemplary system for applying messages multiplexing in shared subscription hubs, according to some embodiments of the present invention.

DESCRIPTION OF SPECIFIC EMBODIMENTS OF THE INVENTION

The present invention, in some embodiments thereof, relates to a publish-subscribe service and, more particularly, but not exclusively, to applying shared subscription hubs for intermediating delivery of messages to shared subscriptions clients.

According to some embodiments of the present invention, there are provided methods, systems and computer program products for increasing server coverage of a plurality of shared subscription clients to a publish-subscribe cluster providing a topic-based publish-subscribe service by executing one or more shared subscription hubs (also referred to as proxies and/or points of presence) to intermediate between the plurality of subscribing clients, in particular distributed subscription clients and a publish-subscribe cluster providing the topic-based publish-subscribe service. The publish-subscribe cluster may comprise one or more servers (brokers), for example, a server, a processing node, a virtual machine and/or the like each executing one or more messaging engines for forwarding messages from a plurality of publishing clients, for example, a device, an application a service and/or the like to one or more subscribing clients, for example, an application according to their subscription to one or more of the plurality of topics available by the publish-subscribe cluster.

The messages may be arranged by topics such that each of the messages is associated with one or more of a plurality of topics, for example, a subject, a field of interest, a group of publishing devices and/or the like that are available by the topic-based publish-subscribe service as is known in the art. For each topic, the messaging engine(s) forward (dispatch) messages associated with the respective topic to all the subscribing client(s) that subscribed for the respective topic.

One or more of the subscribing clients, for example, a handling application may be a distributed subscriptions client that may subscribe for a specific topic at the publish-subscribe cluster through a plurality of shared subscriptions clients in order to increase their message consumption capacity. The distributed subscription clients may employ one or more subscription groups each comprising a plurality of shared subscriptions clients. The distributed subscription clients may be, for example, an application, in particular a distributed application, a service and/or the like while the shared subscription clients may typically be application instances instantiated by the respective distributed subscriptions client. The messages associated with topics that the subscription group shared subscriptions clients are subscribed for are forwarded to the distributed subscriptions client through the plurality of shared subscriptions clients such that each message is forwarded (dispatched) only once to one of the shared subscriptions clients. This may significantly increase the message consumption capacity of the distributed subscriptions client since the messages stream may be distributed over the plurality of shared subscriptions clients.

The shared subscription hub(s) may be applied to improve the server coverage of one or more of the subscription groups over the servers. The server coverage reflects the distribution of the plurality of shared subscriptions over the plurality of servers of the cluster. Since the messages may be published by publishing clients locally connected to each of the plurality of servers, it is desired that the shared subscriptions are distributed over all the servers or at least over the servers on which messages are published for the topics the subscription group clients are subscribed for.

The shared subscription hub(s) may receive a plurality of subscription request for subscribing to one or more topics from one or more subscription groups and may subscribe (connect) to the messaging engine(s) (i.e. servers) on behalf of the shared subscriptions clients according to the subscription request. The shared subscription hub(s) may connect to the servers to serve the subscription request based on analysis of a shared subscriptions information describing shared subscriptions made by one or more subscription groups retrieved from messaging engine(s) executed by the servers of the publish-subscribe cluster. The shared subscription information, means for generation and distribution are detailed in U.S. patent application titled "CLUSTER ASSISTED MQTT SERVER COVERAGE FOR FAT-PIPE CLOUD APPLICATIONS" by Yoav TOCK et al., the contents of which are incorporated herein by reference in their entirety. Based on the analysis relating to the respective subscription group of the requesting shared subscriptions clients, the shared subscription hub(s) may select one or more preferred messaging engines, i.e. preferred server(s) to connect to on behalf of each of the plurality of shared subscriptions clients in order to improve the server coverage of the respective subscription group and/or the respective distributed subscriptions client. Naturally, the shared subscription hub(s) use the subscribing clients information to connect to the publish-subscribe cluster on their behalf. This may be essential to make sure the messaging engine(s) may track (monitor) the shared subscriptions and generate the shared subscriptions information accurately.

The shared subscription hub(s) may employ the functional interface of the publish-subscribe service middleware, for example, a protocol, an application programming interface (API), system calls and/or the like. By using the publish-subscribe service middleware functional interface, the shared subscription hub(s) may emulate the publish-subscribe cluster to the subscribing clients such that the subscribing clients may use the same software implementation to connect (subscribe) to the shared subscription hub(s) as is used to connect to the publish-subscribe cluster. On the publish-subscribe cluster side, the shared subscription hub(s) may use functional interface of the publish-subscribe service middleware to connect to the publish-subscribe cluster emulating standard subscribing client(s).

In some embodiments, the shared subscription hub(s) are employed for MQTT. However, this may not be construed as limiting since the present invention may be applied to one or more other publish-subscribe services middleware.

The shared subscription hub(s) may exhibit significant advantages in delivering an efficient publish-subscribe service to the subscribing clients, in particular to the distributed subscriptions client(s) employing a plurality of shared subscriptions clients. While the publish-subscribe service may be provided by a single server (processing node), many publish-subscribe applications, platforms and/or services may need to handle extremely large numbers of messages received from constantly growing numbers of publishing clients and forward (dispatch) the messages to many subscribing clients. In order to be able to maintain an efficient service for such a heavy load platform, a publish-subscribe service may typically be provided by the publish-subscribe cluster comprising a plurality of servers, either geographically co-located and/or distributed over a plurality of a locations. One of the main problems arising from the cluster architecture is that while the subscribing clients may connect to any server of the publish-subscribe cluster, every message published on a given topic by one of the publishing clients connected to one server, must be received by all the subscribing clients subscribed to the respective topic, regardless of the server the subscribing clients are connected to. This means that every message may need to be broadcasted to one or more of the other servers to verify all subscribing clients receive the published message. This problem may be coupled with another problem of the publish-subscribe services in which "fat pipe" applications, for example, an IoT application, may need to consume vast amounts of messages received from an extremely large number of publishing clients, for example IoT devices. In order to be able to efficiently consume the large numbers of messages, the fat pipe application(s) may typically apply shared subscriptions using one or more subscription groups comprising a plurality of shared subscription clients to simultaneously consume the relevant messages. The shared subscriptions clients should be able to receive the relevant messages for their subscribed topics regardless of the server of the cluster that they are connected to. The server coverage of the shared subscription clients over the servers may typically be sub-optimal, i.e. the shared subscriptions clients of a certain subscription group may not be optimally distributed over the plurality of servers. This may enforce the messages to be transferred between the servers of the cluster to deliver the messages from the originating server on which a respective message is published to all the server(s) to which subscribing clients subscribed for the topic of the respective message are connect. There is therefore an incentive to achieve optimal distribution of the shared subscriptions clients over the servers (server coverage) in order to maintain service quality and/or low latency.

Some currently existing publish-subscribe services may apply one or methods to deal with the two problems, for example, forward messages between the servers of the cluster in order to dispatch locally received messages, published by the locally connected publishing client(s), to subscribing clients connected to another server(s). Forwarding the messages may be done by broadcasting every received message to the other servers in the cluster such that each server may identify relevant messages that need to be delivered to one or more subscribing clients connected to the server. This method may significantly overload the network(s) connecting the cluster's servers and may not support scaling the service to serve high numbers of clients. Another method that may be used by the existing publish-subscribe services may be maintaining routing maps at each of the servers of the cluster. The routing tables may hold routing rules for routing each message to each subscribing client according to its topic subscription(s). This method may also present significant drawback since the routing tables need to be constantly updated in order to detect changes in the service, for example, new subscribing clients, disconnected clients, new topics, and/or the like.

While the existing publish-subscribe services may apply techniques to overcome the problems induced by the sub-optimal server overage, the shared subscriptions hubs may provide means to improve the server coverage of the shared subscriptions in the first place thus avoiding and/or at least reducing the effects of sub-optimal server coverage. Applying the shared subscriptions hubs to intermediate the subscriptions for the shared subscriptions clients may allow better distribution of the shared subscriptions over the plurality of the servers of the cluster. This may significantly increase the serviceability, efficiency and/or reduce latency for the publish subscribe service, in particular for the fat pipe handling applications employing the plurality shared subscriptions. The shared subscriptions hubs may significantly reduce the servers' resources, for example, computation resources, storage resources and/or networking resources required at each of the plurality of servers since a significantly lower traffic volume needs to be transferred between the servers by avoiding and/or reducing messages transfer between the servers. Furthermore, no routing tables may be maintained by the servers, thus further reducing consumption of the servers' resources.

Using the shared subscriptions information collected, exposed and published by the publish-subscribe cluster, the shared subscriptions hubs may identify the distribution of the respective subscription group(s) over the servers of the cluster and connect accordingly to the server(s) that present best server coverage performance. The improved server coverage may significantly contribute to scaling the messages dispatching since the shared subscriptions hubs may be connected to each of the cluster servers (cover the entire cluster) and may convey relevant messages (per topic) published locally at each of the servers to the respective subscription group and/or distributed subscriptions client.

This may serve to avoid the need to transfer the messages to the other servers. Moreover, the shared subscribing hubs may use the load information available through the shared subscriptions information indicating the load of messages published on each of the servers by publishing clients local to the respective server per topic. The shared subscribing hubs may connect accordingly to the servers thus allowing for improved load balancing of the messages consumption of the respective subscription group(s). Furthermore, using the shared subscriptions information, the shared subscriptions hubs may divert, disconnect and/or reconnect to move the shared subscriptions clients from loaded servers to less loaded servers in order to improve messages consumption of the shared subscriptions clients.

While providing the benefits entailed with the improved server coverage, the implementation of the shared subscriptions hubs may be seamless to both the publish-subscribe cluster and/or the subscribing clients. Since the shared subscriptions hubs emulate the publish-subscribe cluster on the subscribing clients side, no code, software and/or operational alterations may be required for the subscribing clients. On the publish-subscribe cluster side, the shared subscriptions hubs may connect (subscribe) as standard subscribing clients do, making the shared subscriptions hubs transparent to the publish-subscribe cluster.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
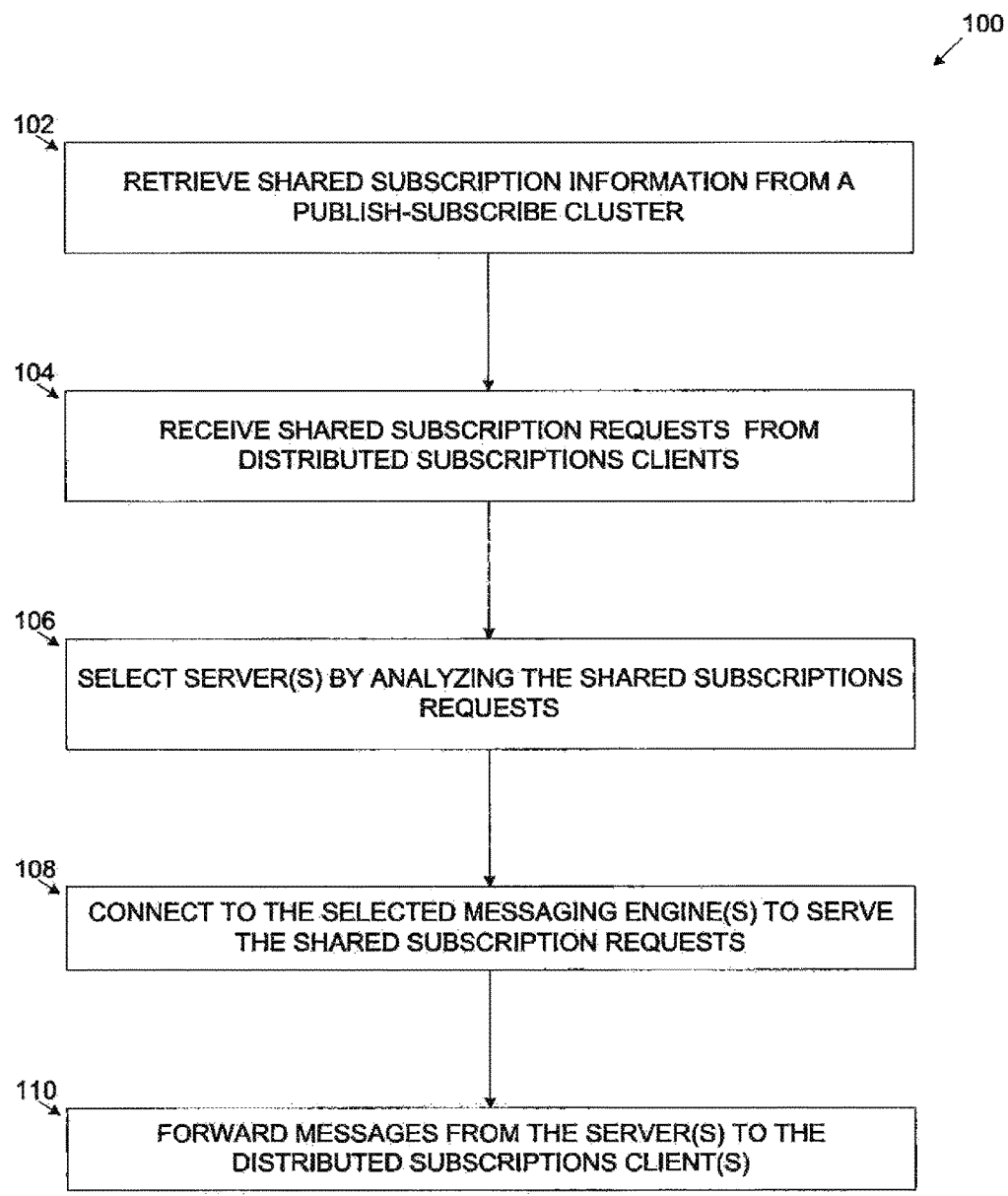

Referring now to the drawings, FIG. 1 illustrates a flowchart of an exemplary process for applying shared subscription hubs to intermediate delivery of messages to a plurality of shared subscriptions clients, according to some embodiments of the present invention. A process 100 may be executed by of one or more shared subscription hubs (also referred to as proxies and/or points of presence to intermediate between a plurality of shared subscription clients and a publish-subscribe cluster providing a topic-based publish-subscribe service to a plurality of clients, for example, a device, an application, a service and/or the like. The publish-subscribe cluster provides the publish-subscribe service to a plurality of clients, for example, a device, an application, a service and/or the like. The publish-subscribe cluster may comprise one or more servers (brokers), for example, a server, a processing node, a virtual machine and/or the like each executing one or more messaging engines for forwarding messages from a plurality of publishing clients to one or more subscribing clients according to their subscription to one or more of the plurality of topics available by the publish-subscribe cluster.

The messages may be arranged by topics such that each of the messages is associated with one or more of a plurality of topics, for example, a subject, a field of interest, a group of publishing devices and/or the like that are available by the topic-based publish-subscribe service as is known in the art. For each topic, the messaging engine(s) forward (dispatch) messages associated with the respective topic to all the subscribing client(s) that subscribed for the respective topic. One or more of the subscribing clients, for example, a handling application may apply shared subscriptions using one or more subscription groups comprising a plurality of shared subscription clients subscribed to the same topic.

The shared subscription hub(s) executing the process 100 may be applied to improve the server coverage of one or more of the subscription groups over the servers. The shared subscription hub(s) may receive a plurality of subscription request for subscribing to one or more topics from a plurality of shared subscriptions clients that are members of one or more subscription groups wherein all shared subscriptions clients of a respective subscription group all subscribe for the same topic(s). The shared subscription hub(s) may subscribe to the messaging engine(s) on behalf of the shared subscriptions clients according to the subscription request. The shared subscription hub(s) may retrieve from the messaging engine(s) shared subscription information describing shared subscriptions made by one or more subscription groups. Based on analysis of the shared subscription information relating to the respective subscription group of the requesting shared subscriptions clients, the shared subscription hub(s) may select a preferred messaging engine, i.e. a preferred server to connect to on behalf of each of the plurality of shared subscriptions clients. The selected messaging engine (server) is selected to improve the server coverage of the shared subscriptions clients over the plurality of servers. Naturally, when subscribing to the messaging engine(s), the shared subscription hub(s) may use the identification information (e.g. subscription group, topic(s), client identification (ID), etc.) of the shared subscriptions clients in order to allow the messaging engine(s) to trace the shared subscriptions and properly generate the shared subscriptions information.

The shared subscription hub(s) may employ the functional interface of the publish-subscribe service middleware, for example, a protocol, an API, system calls and/or the like to emulate the publish-subscribe cluster for the subscribing clients. This may allow the subscribing clients to use the same software implementation to connect (subscribe) to the shared subscription hub(s) as is used to connect to the publish-subscribe cluster. On the publish-subscribe cluster side, the shared subscription hub(s) may connect (subscribe) to the publish-subscribe cluster using the same functional interface used by standard subscribing client(s).

The shared subscriptions information may be collected by the messaging engines (servers) monitoring a plurality of subscriptions made by the shared subscriptions clients as described in U.S. patent application titled "CLUSTER ASSISTED MQTT SERVER COVERAGE FOR FAT-PIPE CLOUD APPLICATIONS" by Yoav TOCK et al., the contents of which are incorporated herein by reference in their entirety. The shared subscriptions information may include, for example, a shared subscriptions topic(s), a number of shared subscriptions made per topic per server, a number of shared subscriptions made by each subscription group per server, a number of shared subscriptions made by each subscription group per server per handling application name, a subscription group identification, a number of instances of the shared subscriptions applications and/or the like.

Figure 2:
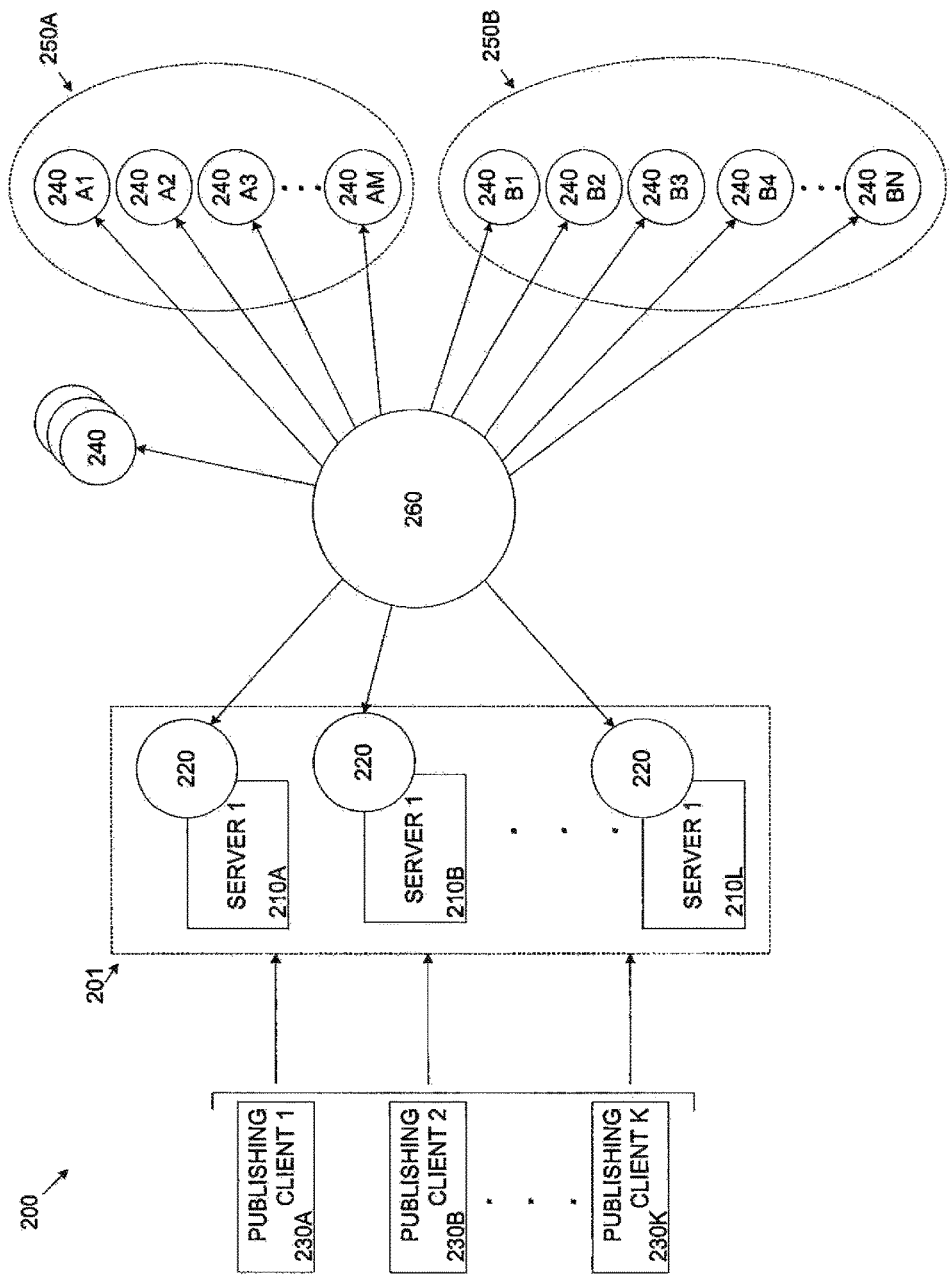

Reference is also made to FIG. 2, which is a schematic illustration of an exemplary system for applying shared subscription hubs to intermediate delivery of messages to a plurality of shared subscription clients, according to some embodiments of the present invention. A publish-subscribe system 200 includes a publish-subscribe cluster 201 providing the publish-subscribe service middleware, for example, IBMWMQ, IBMMS, RabitMQ, MQTT, JMS and/or the like. The publish-subscribe cluster 201 may comprise a plurality of servers (brokers) 210 each executing one or more messaging engines 220. The messaging engine(s) 220 forward messages received from one or more of a plurality of publishing clients 230 to one or more of a plurality of subscribing clients 240. Each of the servers 210, for example, a server, a processing node, a virtual machine and/or the like comprises one or more processing nodes each having one or more processors (homogenous or heterogeneous), which may be arranged for parallel processing, as clusters and/or as one or more distributed core processing units. Each of the processor(s) may execute one or more software modules, for example, the messaging engine 220, wherein a software module refers to a plurality of program instructions stored in a non-transitory medium and executed by the processor(s). One or more shared subscription hubs 260 may be applied to intermediate between the subscribing clients, in particular the shared subscriptions clients 240 that are members of one or more subscription groups 250 and the messaging engine(s) 220 executed by the servers 210 of the publish-subscribe cluster 201. The shared subscription hub(s) 260 may be executed by one or more of the servers 210. Additionally and/or alternatively, the shared subscription hub(s) 260 may be executed by one or more other servers such as the servers 210 that are not an integral part of the publish-subscribe cluster 201, i.e. server(s) that do not necessarily host the messaging engines but rather execute the shared subscription hub(s) 260 and communicate over one or more networks with the servers 210.

The publishing clients 230k (k=A, B, . . . K) such as, for example, a publishing client 230A, a publishing client 230B and so forth through a publishing client 230K publish messages to the messaging engines 220 at the servers 210l (l=A, B, . . . L), for example, a server 210A, a server 210B and so forth through a server 210L. Each publishing client 230k may be, for example, a device, an application, a service and/or the like that publishes data and/or information through messages to the publish-subscribe cluster 201 to be available to one or more subscribing clients 240. The publishing device may be, for example, an IoT device, for example, a sensor, a controller, a smart device and/or the like that publishes data it collects on the publish-subscribe cluster 201. The publishing application may be, for example, an enterprise application, for example, JMS and/or the like, a publishing service and/or the like.

The present invention focuses on shared subscriptions applied by one or more distributed subscriptions clients, for, example, an application, i.e. a handling application, for example, fat pipe applications, a service and/or the like. The distributed subscriptions clients, for example, applications residing on the back-end or the cloud side of an IoT system, M2M applications, organization infrastructure applications and/or the like, may consume extremely high volumes of messages. The high consumption handling applications may need to consume the large numbers of the messages as they may subscribe to multiple topics, subscribe through wide wild-card topic filters subscriptions and/or the like. The wildcard topic filtering allows the subscribing clients 240 to subscribe to a plurality of topics through a single subscription by using only a portion of the topic.

In order to handle the large number of messages, the distributed subscriptions clients may subscribe to the publish-subscribe cluster 201 through one or more subscription groups 250, for example, a subscription group 250A and/or 250B each comprising a plurality of shared subscriptions clients 240 constituting a subset of the plurality of subscribing clients 240. For example, the subscription group 250A may include one or more shared subscriptions clients 240Am (m=0, 1, . . . M) and the subscription group 250B may include one or more shared subscriptions clients 240Bn (n=0, 1, . . . N). This means that the respective distributed subscriptions client employing the subscription group 250A subscribes to the publish-subscribe cluster 201 through M shared subscriptions clients, for example, a shared subscriptions client 240A1, a shared subscriptions client 240A2, a shared subscriptions client 240A3 and so forth through a shared subscriptions client 240AM. Similarly, a respective distributed subscriptions client employing the subscription group 250B subscribes to the publish-subscribe cluster 201 through N shared subscriptions clients, for example, a shared subscriptions client 240B1, a shared subscriptions client 240B2, a shared subscriptions client 240B3, a shared subscriptions client 240B4 and so forth through a shared subscriptions client 240BN.

The subscription group 250 may be applied by the respective distributed subscriptions client, for example, the handling application through, for example, instantiation of a plurality of instances of the respective handling application. Additionally and/or alternatively, the subscription group 250 may be applied through multiple subscriptions made by the respective distributed subscriptions client itself. Typically, not only receiving the published messages burdens the distributed subscriptions client but also processing them. Therefore the plurality of instances may be instantiated to allow fast and/or efficient consumption and/or processing of the received messages. For brevity, the shared subscriptions clients as described herein after are applied using the plurality of instances however other shared subscriptions implementations may apply.

Before further describing some embodiments of the present invention the concept of shared subscriptions is first described.

Figure 3A:
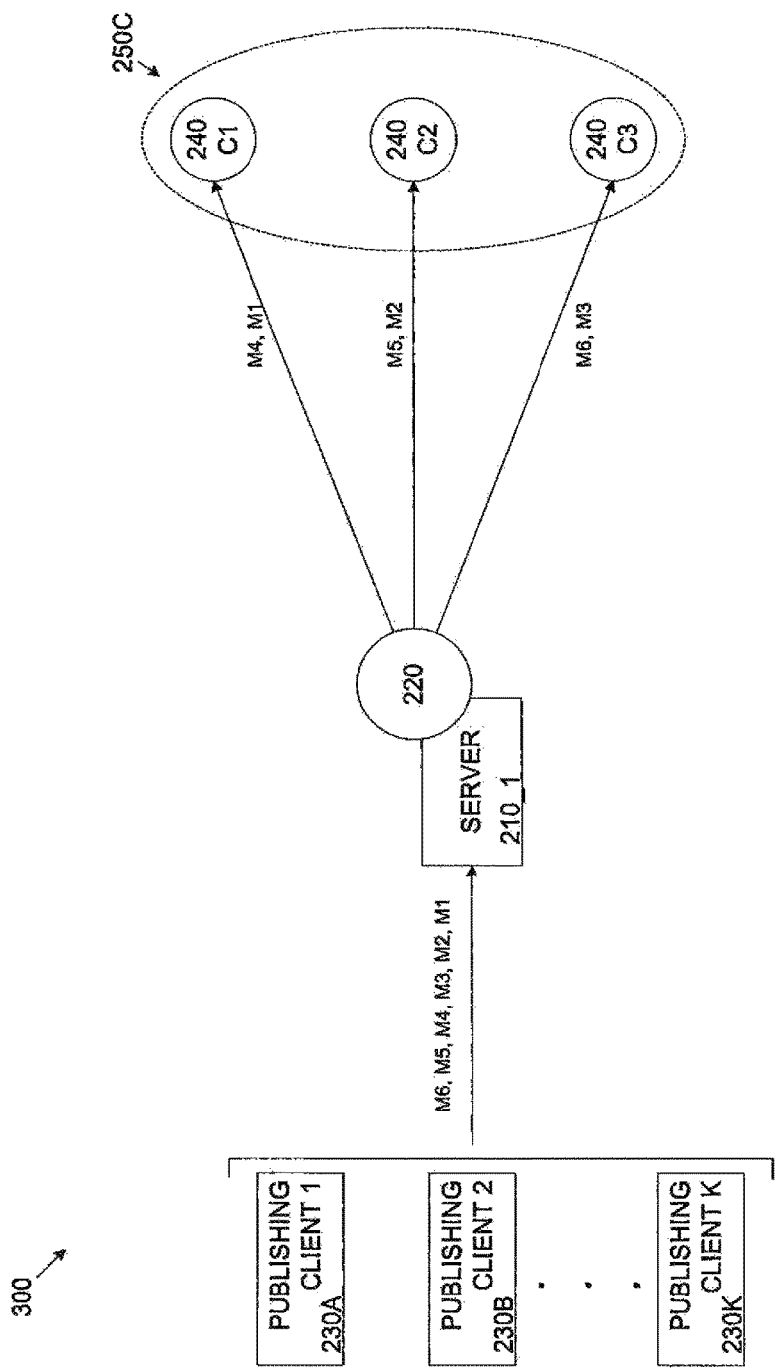
FIG. 3A is a schematic illustration of an exemplary publish-subscribe system supporting shared subscriptions.

Reference is now made to FIG. 3A, which is a schematic illustration of an exemplary publish-subscribe system supporting shared subscriptions. An exemplary publish-subscribe system 300 comprises a single Server 210_1 such as the server 210 executing one or more messaging engines such as the messaging engine 220. The messaging engine(s) 220 forward a plurality of messages M, for example, M1, M2, M3, M4, M5 and/or M6 published by a plurality of publishing clients such as the publishing clients 230k to a distributed subscriptions client employing a subscription group 250C such as the subscription group 250 that comprises three shared subscriptions clients, 240C1, 240C2 and 240C3. The messages M1-M6 are associated with a topic the distributed subscriptions client is subscribed for and are therefore forwarded by the messaging engine 220 to the shared subscriptions clients 240C1, 240C2 and 240C3.

In case shared subscriptions are not applied in the system 300, i.e. the distributed subscription client subscribes to the messaging engine 220 through a single subscribing client 240, all messages M1-M6 would be forwarded to the distributed subscription client through the single subscribing client 240. This may overload the connection of the single subscribing client 240 thus reducing the message consumption capacity of the single subscribing client 240. However by employing the subscription group 250C, the distributed subscription client may receive the messages M1-M6 through a plurality of the shared subscriptions clients 240C1, 240C2 and/or 240C3 thus increasing the message consumption capacity. The messaging engine 220 forwards (dispatches) each message M in an alternating manner, such that each message M is sent only once and to only one of the members of the subscription group 250. For example, the messages M1 and M4 are forwarded through the shared subscriptions client 240C1, the messages M2 and M5 are forwarded through the shared subscriptions client 240C2 and the messages M3 and M6 are forwarded through the shared subscriptions client 240C3. The messaging engine(s) 220 are responsible for tracing each of the messages M to verify that each message is indeed forwarded to each of the subscribing clients 240 according to its subscription. The messaging engine(s) 220 also verify a single delivery of each message to the distributed subscriptions client(s) through one of the shared subscriptions clients 240 according to the subscription group(s) 250. In order to achieve this, the messaging engine(s) 220 may maintain a routing map defining one or more messages forwarding rules and/or directives. The forwarding rules and/or directives may be created and/or adjusted by the messaging engine(s) 220 according to the detected shared subscriptions made by shared subscription clients of each subscription group 250, for example, the subscription group 250C to the server 210_1. The messaging engine(s) 220 may detect the shared subscriptions by analyzing a unique identification (ID) assigned to each of the subscribing clients 240.

Figure 3B:
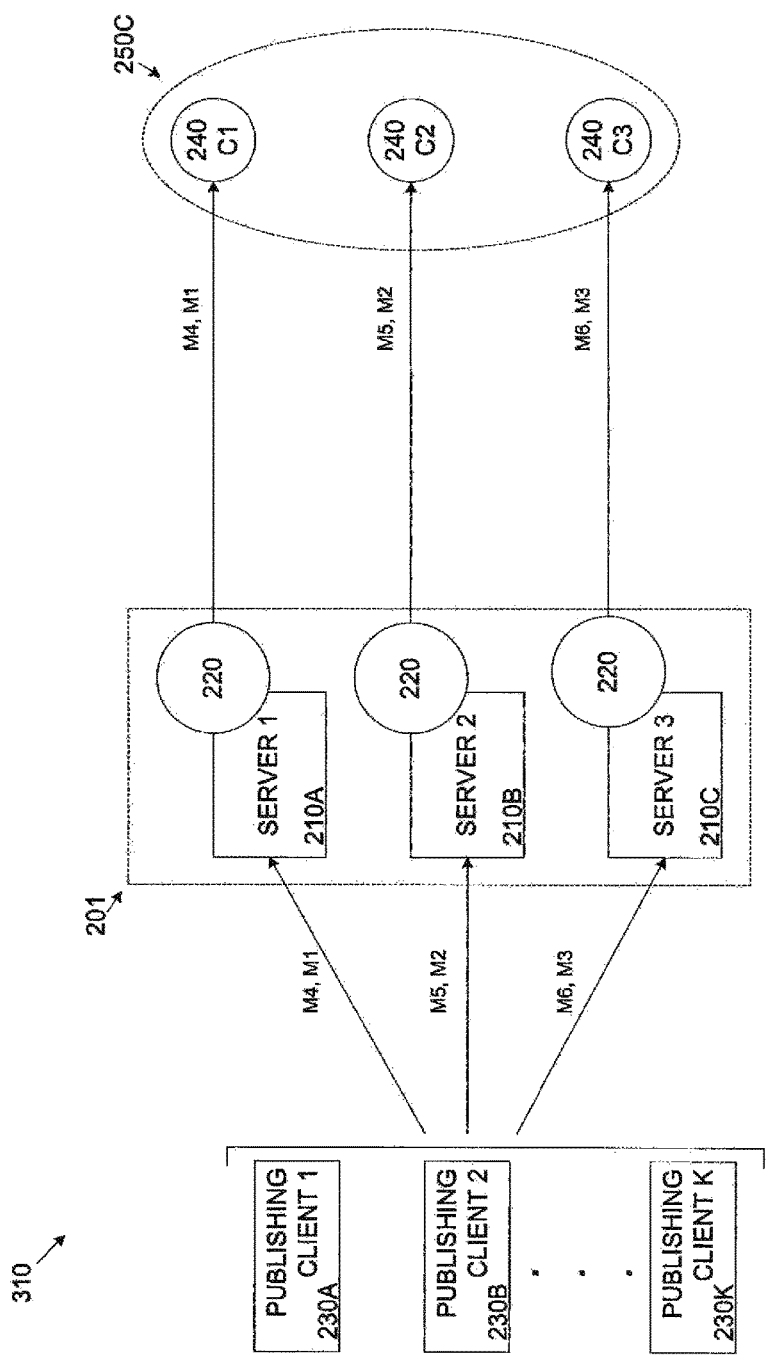
FIG. 3B is a schematic illustration of an exemplary publish-subscribe cluster system supporting shared subscriptions.

Reference is also made to FIG. 3B, which is a schematic illustration of an exemplary publish-subscribe cluster system supporting shared subscriptions. An exemplary publish-subscribe system 310 includes a publish-subscribe cluster such as the cluster 201 comprising one or more servers, for example, a server 210A, a server 210B and a server 210C such as the server 210 each executing one or more messaging engines such as the messaging engine 220. The messaging engines 220 forward the plurality of messages M1-M6 to the distributed subscriptions client employing the subscription group 250C comprising the shared subscriptions clients, 240C1, 240C2 and 240C3.

While in the system 300 all messages M1-M6 are published by the publishing clients 230k on the server 210_1, in the system 310 the messages M1-M6 may be published on any of the servers 210A, 210B and/or 210C according to the connections of the publishing clients 230k to the servers 210A-210C. As discussed before, by employing the shared subscription group 250C, the distributed subscriptions client may significantly increase its message consumption. However, for the publish-subscribe cluster 201, the efficiency of the publish-subscribe service may be significantly increased by distributing the shared subscriptions clients 240 over all the servers 210A-210C or at least over the relevant servers 210, i.e. achieving high server coverage for the subscription group 250C. The relevant servers 210 are the servers 210 on which messages are published that are associated with the topic(s) for which the shared subscriptions clients 240C1-240C3 are subscribed, for example the servers 210A-210C. For example, the shared subscriptions client 240C1 may connect to the messaging engine 220 executed by the server 210A, the shared subscriptions client 240C2 may connect to the messaging engine 220 executed by the server 210B and/or the shared subscriptions client 240C3 may connect to the messaging engine 220 executed by the server 210C. By achieving high server coverage, message transfer between the servers 210A-210C may be significantly reduced and/or completely avoided. Each of the servers 210A-210C may forward the messages locally published on its messaging engine(s) to the shared subscription client(s) connected to it. For example, the messaging engine(s) 220 executed by the server 210A may forward the messages M, for example, the message M1 and/or the message M4 published on it by one or more of the publishing clients 230k to the respective shared subscriptions client(s) 240, for example, the shared subscriptions client 240C1. Similarly, the messaging engine(s) 220 executed by the server 210B may forward the messages M2 and/or the message M5 to the respective shared subscriptions client 240C2 and the messaging engine(s) 220 executed by the server 210C may forward the messages M3 and/or the message M6 to the respective shared subscriptions client 240C3.

In order to properly trace delivery of the messages M to the shared subscriptions clients 240, for example, the shared subscriptions clients 240C1-240C3, the messaging engine(s) 220 may maintain the routing map defining one or more messages forwarding rules and/or directives. The forwarding rules and/or directives may be created and/or adjusted by the messaging engine(s) 220 according to the detected shared subscriptions made by shared subscription clients of each subscription group 250, for example, the subscription group 250C to each of the servers 210, for example, the servers 210A-210C. The messaging engine(s) 220 may detect the shared subscriptions by analyzing a unique identification (ID) assigned to each of the subscribing clients 240.

Reference is made once again to FIG. 1 and FIG. 2. In order to improve server coverage of the subscription group(s) 250 while avoiding and/or minimizing alterations to the shared subscriptions clients 240, the shared subscription hub(s) 260 are applied to perform as intermediators between the shared subscriptions clients 240 and the messaging engines 220 executed on their respective server(s) 210. The shared subscriptions clients 240 are therefore actually not subscribing to the messaging engine(s) 220 but rather to the shared subscription hub(s) 260. The shared subscription hub(s) 260 may then connect (subscribe) to the messaging engine(s) 220 according to the subscription request of the shared subscriptions clients 240 and by analyzing the shared subscription information retrieved from the publish-subscribe cluster 201.

In some embodiments of the present invention, the publish-subscribe system 200 may be illustrated for an exemplary implementation for the MQTT, however the publish-subscribe system 200 may apply to a plurality of other publish-subscribe middleware and/or services as described herein above.

As the publish-subscribe service provided by the publish-subscribe cluster 201 is topic-based, the messages published at the publish-subscribe cluster 201 may be arranged by topics such that each message is classified (associated) to one of a plurality of topics. Each subscribing client 240 subscribes to one or more of the topics. The subscribing clients 240 may use wild-card topics and/or topic filters subscription(s) to extract messages of interest. For example, for MQTT, assuming there is a first topic $Topic/news/English and a second topic $Topic/news/German, one or more of the subscribing clients 240 may apply a wild-card topic filter, for example, $Topic/news/* such that the messaging engine(s) 220 may forward all messages classified for both the topic $Topic/news/English and the topic Topic/news/German to the respective subscribing client(s) 240.

As shown at 102, the shared subscription hub(s) 260 retrieve the shared subscription information from the messaging engine(s) 220 executed by the servers 210 providing the publish-subscribe service and/or middleware for the plurality of publishing clients 230 and the plurality of subscribing clients 240. The shared subscription information may be generated by the messaging engine(s) 220 monitoring shared subscription made by one or more distributed subscriptions clients, for example, the fat pipe application applying shared subscriptions using one or more subscription groups, for example, the subscription group 250A and/or the subscription group 250B.

The shared subscriptions information may be exposed and/or published by the messaging engine(s) 220 through the publish-subscribe service, for example, as system topics. The shared subscriptions system topics may be available to any subscribing client 240 that subscribes to the publish-subscribe cluster 201. The shared subscriptions system topics may therefore be available to the shared subscriptions hub(s) 260 that may subscribe for one or more of the shared subscription information system topics. The shared subscriptions hub(s) 260 may employ the same functional interface, for example, a protocol, an API, system calls and or the like as used by the subscribing clients 240 to connect (subscribe) to the publish-subscribe cluster 201 for one or more of the topics, in particular the system topics. For example, in case the publish-subscribe cluster 201 provides MQTT, the system topics may be in the format of $SYS/. Details on the shared subscription information and the systems, methods and/or computer program products for collecting, generating, exposing and/or publishing the shared subscriptions information are disclosed by U.S. patent application titled "CLUSTER ASSISTED MQTT SERVER COVERAGE FOR FAT-PIPE CLOUD APPLICATIONS" by Yoav TOCK et al., the contents of which are incorporated herein by reference in their entirety.

The shared subscriptions information may include, for example, a membership system topic identifying the server(s) 210 of the publish-subscribe cluster 201 in order to expose the availability of the servers 210 in the publish-subscribe cluster 201. In some embodiment in which the publish-subscribe cluster 201 provides the MQTT, the membership system topic may be defined as $SYS/Cluster/Membership. Records of the membership system topic may be maintained by the messaging engine(s) 220 to keep an updated view of the publish-subscribe cluster 201, for example, in case one or more servers 210 are added and/or removed from the publish-subscribe cluster 201. The records may include one or more fields each indicating an endpoint ID and/or access information for one or more endpoints in each of the servers 210, for example, a server name, a server ID, a domain, an Internet Protocol (IP) address, a port and/or the like. The set of record(s) published in the membership system topic may be represented in one or more machine readable formats, for example JavaScript Object Notation (JSON), Extensible Markup Language (XML) and/or the like.

The membership system topic may be implemented in the MQTT in a plurality of formats. For example, subscribing to the membership system topic such as, for example, $SYS/Cluster/Membership may yield the following message:

```
{servers: [
    {ID: "210A",
        Name: "210A",
        endpoints: [{address: "10.10.10.10", port: "33333"}]
    },
    {ID: "210B",
        Name: "210B",
        endpoints: [{address: "10.10.10.11", port: "33334"}]
    },
    {ID: "210L",
        Name: "210L",
        endpoints: [{address : "10.10.10.13", port: "33335"},
                    {address : "11.11.11.13", port: "33335"}]
    },
]}
```

Where ID denotes each of the servers 210 in the publish-subscribe cluster, the name denotes the name assigned to the respective server 210 and endpoints denotes the endpoints (access points) through which the subscriptions may be made to the respective server 210, including the IP address(s) and/or the port(s) number.

The shared subscriptions information may also include information describing coverage of one or more subscription groups 250 applied for shared subscriptions by one or more distributed subscriptions clients. The shared subscriptions coverage may indicate a number of subscriptions made by the shared subscriptions client(s) 240 that are members of a respective subscription group 250, for example, the shared subscriptions clients 240A1-240Am, the clients 240B1-240Bn and/or the like. Naturally, as there may be a plurality of subscription groups, each of the subscription group(s) 250 may be designated with a subscription name, for example, a SubName. For the MQTT, a SharedSubCoverage system topic may be defined as $SYS/Cluster/SharedSubCoverage/ <SubName> Such that each subscription group 250 is assigned a different <SubName>. Records of the SharedSubCoverag system topic may be maintained by the messaging engine(s) 220 to keep an updated shared subscriptions "map" that maps the number of subscriptions made by shared subscriptions clients 240 of each subscription group 250 to each of the servers 210.

The SubName system topic may be implemented in the MQTT in a plurality of formats. For example, subscribing to a shared subscriptions coverage system topic, such as, for example, $SYS/Cluster/SharedSubCoverage/250A may yield the following message:

```
{subName: "250A",
serverCoverage: [
    {ID: "210A", numSubscribers: "10"},
    {ID: "210B", numSubscribers: "5"},
    {ID: "210L", numSubscribers: "0"}]}
```

Where ID denotes the server 210 to which the shared subscriptions are made and numSubscribers denotes the number of shared subscriptions made by the shared subscriptions clients 240*m* that are members of the subscription group 250A.

As another example, subscribing to another shared subscriptions coverage system topic, such as, for example, $SYS/Cluster/SharedSubCoverage/250B may yield the following message:

```
{subName: "250B",
serverCoverage: [
    {ID: "210A", numSubscribers: "0"},
    {ID: "210B", numSubscribers: "3"},
    {ID: "210L", numSubscribers: "6"}]}
```

The shared subscription information may further include an AppCoverage system topic defined as $SYS/Cluster/AppCoverage/<AppID> Such that each distributed subscriptions client is assigned a different AppID. Records of the AppCoverage system topic may be maintained by the messaging engine(s) 220 to keep an updated shared subscriptions "map" that maps the number of subscriptions made by shared subscriptions clients 240 of each subscription group 250 employed by each distributed subscriptions client to each of the servers 210.

Typically, each of the shared subscriptions clients 240 connecting to the publish-subscribe cluster 201 may identify its respective distributed subscriptions client, for example, an application it belongs to (an instance of) using a prefix of the client-id. For example, the client-id field may be of the following structure: <T>: <Org>:<AppName>:<instance-id>, where T is the distributed subscriptions client type, for example, the handling application type, Org is the organization name, AppName is the distributed subscriptions client name, for example, the handling application name, and instance-id is a unique suffix assigned to each of the instances of the handling application. The AppID may therefore be defined as AppID=<T>: <Org>:<AppName>. For example, assuming the a distributed subscriptions client, for example, an application LightControl is of type A, such that T='A' deployed in the organization 'IBM', such that Org='IBM' and applies shared subscriptions to the publish-subscribe cluster 201. Each of the shared subscriptions clients 240 of the handling application LightControl may therefore be identified by a client ID, for example, ClientID=A:IBM: LightControl:123.

The AppID system topic may be implemented in the MQTT in a plurality of formats. For example, subscribing to a shared subscriptions coverage per application system topic, such as, for example, $SYS/Cluster/AppCoverage/LightControl may yield the following message:

```
{AppID: "A:IBM:LightControl",
serverCoverage: [
    {ID: "210A", numSubscribers: "0"},
    {ID: "210B", numSubscribers: "3"},
    {ID: "210L", numSubscribers: "6"}]}
```

Optionally, the shared subscriptions information includes additional shared subscriptions coverage system topics, for example, load information and/or the like. The load information may be expressed as, for example, queuing information indicating the average and/or maximal queue length. The queuing information may be calculated, for example, per subscription group 250, per distributed subscriptions client and/or the like. The queuing information may be collected by measuring the queue for each message stream associated with each subscription group 250, distributed subscriptions client and/or the like over a pre-defined time interval. For example, for the MQTT, a SharedSubLoad system topic providing load information per subscription group 250 (SubName) may be defined as $SYS/Cluster/SharedSubLoad/<SubName>.records of the SharedSubLoad system topic may be maintained by the messaging engine(s) 220 to keep an updated load information per server 210 available to the shared subscriptions clients 240.

The SharedSubLoad system topic may be implemented in the MQTT in a plurality of formats. For example, subscribing to a shared subscriptions coverage system topic, such as, for example, $SYS/Cluster/+/250A may yield the following message:

```
{subName: "250A",
serverCoverage: [
    {ID: "210A", numSubscribers: "10"},
    {ID: "210B", numSubscribers: "5"},
    {ID: "210L", numSubscribers: "5"}],
serverLoad: [
    {ID: "210A", queueLength: "0"},
    {ID: "210B", queueLength: "1"},
    {ID: "210L", queueLength: "100"}]}
}
```

As shown at 104, the shared subscription hub(s) 260 may receive from the plurality of subscribing clients 240, in particular the shared subscription clients 240, a plurality of subscription requests to subscribe to the publish-subscribe cluster 201 for on more of the topics. As shown in the system 200, instead of issuing subscription requests directly to the messaging engine(s) 220 for subscribing to the publish-subscribe cluster 201, the subscribing clients 240 may direct their subscription requests to the shared subscription hub(s) 260. The shared subscriptions hub(s) 260 may employ the functional interface, for example, a protocol, an API, system calls and or the like as used by the publish-subscribe cluster 201 to emulate the publish-subscribe cluster 201 to the subscribing clients 240 thus making the shared subscriptions hub(s) 260 seamless to the subscribing clients 240. While requesting to subscribe, the shared subscription hub(s) 260 may receive from each of the shared subscription clients 240 client information describing the shared subscription client 240, for example, the name(s) of its subscription group(s) (SubName(s)), the name of the distributed subscriptions client 240 belongs to, for example, an instance of (AppName) and/or the like. In some embodiments, the AppName may be extracted from the client ID of the shared subscription client 240. For example, assuming the client ID is "X:ORG:AppName:UID", the AppName may be collected by analyzing from the client ID.

The shared subscription clients 240 may subscribe using shared subscriptions as defined by the standard (specification) of the publish-subscribe service provided by the publish-subscribe cluster 201, for example, the MQTT. In case the publish-subscribe cluster 201 provides MQTT, each of the shared subscriptions clients 240 of a respective subscription group 250 may initiate the shared subscription using the following command and/or message:

$SharedSubscription/SubName/topicFilter

Where $SharedSubscription is a reserved prefix, SubName is the name of the subscription group 250 and topicFilter is an MQTT topic filter.

As shown at 106, the shared subscription hub(s) 260 analyze the received subscription requests, in particular the shared subscriptions request with respect to the shared subscription information collected from the messaging engine(s) 220 executed by the publish-subscribe cluster 201. Based on the analysis of the share subscription information, the shared subscription hub(s) 260 may select one or more preferred messaging engines of the messaging engines 220 for subscribing (connecting) to. The shared subscription hub(s) 260 may select may select the preferred messaging engine(s) (servers) that may present best server coverage performance for the shared subscriptions clients 240 that issued the shared subscription requests. The shared subscription hub(s) 260 may select the preferred messaging engine(s) 220 to be those executed by server(s) 210 that may be least covered by other shared subscriptions clients of the same subscription group 250. The shared subscription hub(s) 260 may further select the preferred messaging engine(s) 220 to balance message consumption load of one or more of the subscription groups 250 and/or the distributed subscriptions clients.

As a first example, using the system topic $SYS/Cluster/Membership and the system topic $SYS/Cluster/SharedSubCoverage/<SubName>, one or more of the shared subscriptions hubs 260 may employ simple heuristics to select a server 210 to select the preferred server in order to improve the distribution of the respective subscription group 250 over the servers 210, i.e. improving the server coverage. For example, assuming one of the shared subscriptions hubs 260 receives a shared subscription request from one of the shared subscriptions clients 240Am of the subscription group 250A. Analyzing the system topic $SYS/Cluster/SharedSubCoverage/250A, the shared subscriptions hub 260 may detect that none of the shared subscriptions clients 240Am of the subscription group 250A are currently connected to the server 210L and may therefore select the server 210L as the preferred server. Similarly, assuming one of the shared subscriptions hubs 260 receives a shared subscription request from one of the shared subscriptions clients 240Bn of the subscription group 250B. Analyzing the system topic $SYS/Cluster/SharedSubCoverage/250B, the shared subscriptions hub 260 may detect that none of the shared subscriptions clients 240Bn of the subscription group 250B are currently connected to the server 210A and may therefore select the server 210A as the preferred server.

As a second example, the shared subscriptions hub(s) 260 may use the Membership system topic and the AppCoverage system topic corresponding with its name, for example, the $SYS/Cluster/AppCoverage/LightControl system topic. Assuming one of the shared subscriptions hubs 260 receives a shared subscription request from one of the shared subscriptions clients 240 initiated by an instance of the distributed subscriptions client (handling application) LightControl. Analyzing the system topic $SYS/Cluster/AppCoverage/LightControl, the shared subscriptions hub 260 may detect that no shared subscriptions clients 240 initiated by other instances of the handling application LightControl are currently connected to the server 210A and may therefore select the server 210A as the preferred server.

As a third example, the shared subscriptions hub(s) 260 may use the Membership system topic and the SharedSubLoad system topic, for example, the $SYS/Cluster/+/250A system topic. Assuming one of the shared subscriptions hubs 260 receives a shared subscription request from one of the one of the shared subscriptions clients 240Am of the subscription group 250A. Analyzing the system topic $SYS/Cluster/+/250A, the shared subscriptions hub 260 may detect that the messages queue on at the messaging engine 220 executed by the server 210L is the longest suggesting that the messages may not be consumed sufficiently fast at the server 210L and may therefore select the server 210L as the preferred server.

As shown at 108, the shared subscriptions hub(s) 260 may connect to one or more of the messaging engines 220 executed by the preferred server(s) 210 on behalf of the requesting subscribing clients 240, in particular the shared subscriptions clients 240, for example, the clients 240Am and/or 240Bn. The shared subscriptions hub(s) 260 may use the same functional interface, for example, a protocol, an API, system calls and or the like as used by the subscribing clients 240 to connect (subscribe) to the publish-subscribe cluster 201 on behalf of the shared subscriptions clients 240. This may make the shared subscriptions hub(s) 260 transparent to the publish-subscribe cluster 201 that may interpret the connections made by the shared subscriptions hub(s) 260 as regular subscriptions made by one or roe of the subscribing clients 240. In case the publish-subscribe cluster 201 provides MQTT, the shared subscriptions hub(s) 260 may initiate the shared subscription for each of the requesting shared subscriptions clients 240 using the following command and/or message:

$SharedSubscription/SubName/topicFilter

When connecting (subscribing) to the messaging engine(s) 220 at the preferred server(s) 210, the shared subscriptions hub(s) 260 use the client information received from the shared subscriptions client 240. This is done to allow the messaging engine(s) 220 to properly trace the shared subscriptions made to the servers(s) 210 in order to generate and provide the shared subscription information accurately.

Continuing the first example, the shared subscriptions hub 260 that received the shared subscription request from one of the shared subscription clients 250Am and selected the server 210L as the preferred server may connect to the server 210L in order to improve the server coverage of the subscription group 250A. Similarly, the shared subscriptions hub 260 that received the shared subscription request from one of the shared subscription clients 250Bn and selected the server 210A as the preferred server may connect therefore connect to the server 210A in order to improve the server coverage of the subscription group 250B.

Continuing the second example, the shared subscriptions hub 260 that received the shared subscription request from one of the shared subscription clients 240 initiated by the instance of the distributed subscriptions client (handling application) LightControl and selected the server 210A as the preferred server may connect to the server 210A in order to improve the server coverage of the handling application LightControl.

Continuing the third example, the shared subscriptions hub 260 that received the shared subscription request from one of the shared subscription clients 240Am and selected the server 210L as the preferred server based on analysis of the load may connect to the server 210L in order to improve message consumption at the server 210L and balance the message consumption load over the servers 210.

In some embodiments of the present invention, the shared subscription hub(s) 260 may be arranged in one or more configurations, for example, a private hub, a public hub and/or a dedicated hub. Two or more configurations may also be used to serve the plurality of subscribing clients 240, in particular the shared subscriptions clients 240.

Figure 4:
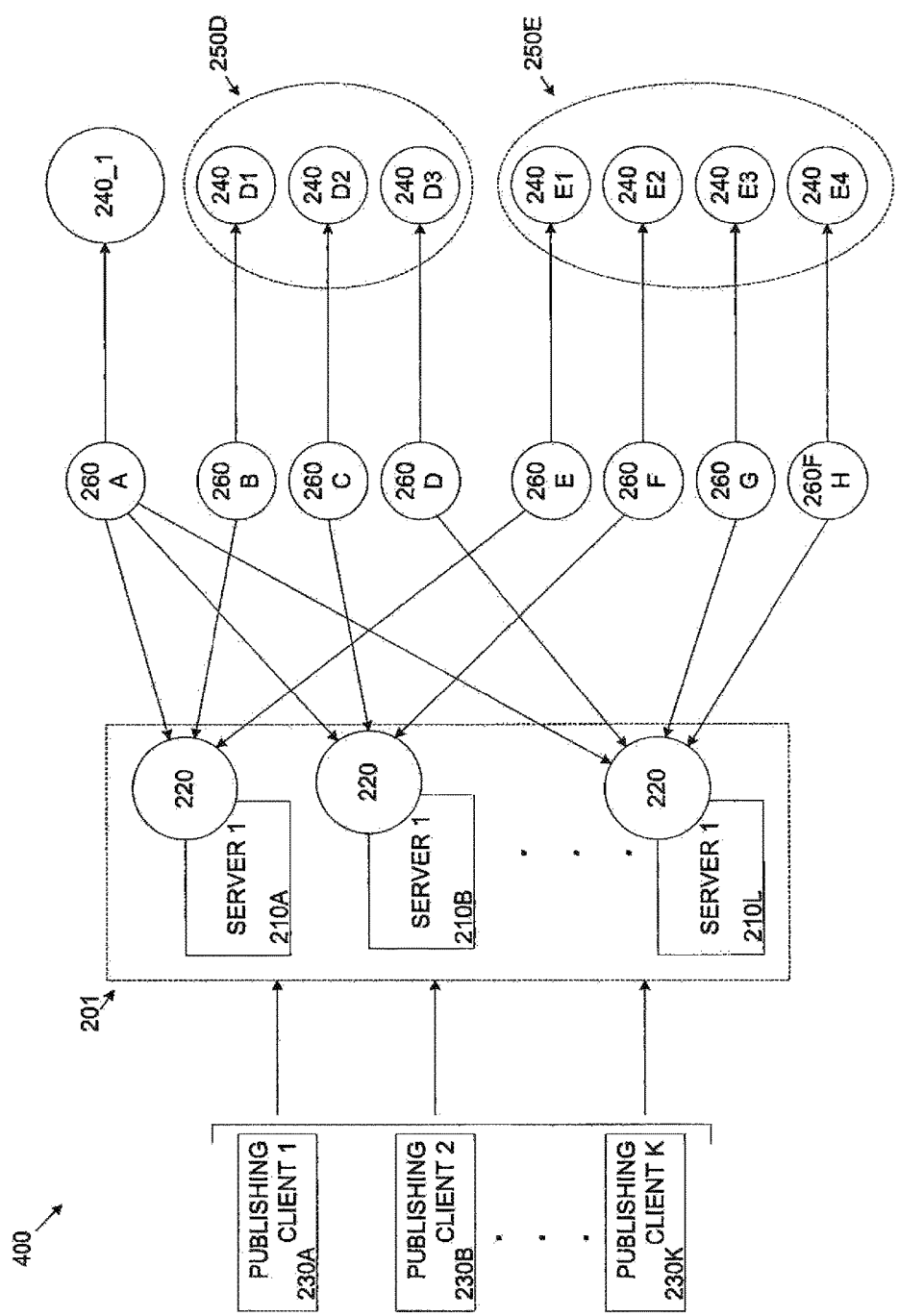
FIG. 4 is a schematic illustration of an exemplary system for applying private shared subscription hubs to intermediate delivery of messages to a plurality of shared subscription clients, according to some embodiments of the present invention.

Reference is now made to FIG. 4, which is a schematic illustration of an exemplary system for applying private shared subscription hubs to intermediate delivery of messages to a plurality of shared subscription clients, according to some embodiments of the present invention. A system 400 includes a publish-subscribe cluster such as the publish-subscribe cluster 201 comprising L servers 210 such as the servers 210A through 210L each executing one or more messaging engines such as the messaging engines 220 for forwarding messages published by a plurality of publishing clients such as the publishing clients 230 to a plurality of subscribing clients such as the subscribing clients 240. Some of the subscribing clients 240 are members of subscription groups such as the subscription group 250, for example a subscription group 250D and a subscription group 250E that may be applied by one or more distributed subscriptions clients, for example, a handling application, in particular a fat pipe application for shared subscription for one or more topics available at the publish-subscribe cluster 201. The subscription group 250D may comprise, for example, three shared subscriptions clients, a shared subscriptions client 240D1, a shared subscriptions client 240D2 and a shared subscriptions client 240D2. The subscription group 250E may comprise, for example, four shared subscriptions clients, a shared subscriptions client 240E1, a shared subscriptions client 240E2, a shared subscriptions client 240E3 and a shared subscriptions client 240E4.

In the private hub configuration the subscribing client 240 as well as the shared subscriptions clients 240 may be assigned with a private shared subscription hub 260. For example, the subscribing client 240_1 (which is not a shared subscription client) is assigned with a private shared subscription hub 260A, each of the shared subscriptions clients 240D1, 240D2 and 240D3 may be assigned with a private shared subscription hub 260B, 260C and 260D respectively and each of the shared subscriptions clients 240E1, 240E2, 240E3 and 240E4 may be assigned with a private shared subscription hub 260E, 260F, 260G and 260H respectively.

As shown in the system 400, the private shared subscriptions hub 260A, for example, may connect to a plurality of servers 210 on behalf of the subscribing client 240_1. The private shared subscriptions hub 260A may connect to all the servers 210A-210L or at least to all relevant servers 210 on which messages associated with topic(s) the subscribing client 240_1 is subscribed for. By connecting to all the relevant servers 210 the private shared subscriptions hub 260A may receive the messages directed for the subscribing client 240_1 directly from each of the relevant servers 210 thus avoiding and/or reducing the need for the servers 210 to transfer messages between them.

As shown in the system 400, the private shared subscriptions hubs 260B, 260C and 260D, for example, may each connect to a subset of the servers 210 on behalf of the subscription group 250D. For example, private the shared subscriptions hubs 260B may connect to the messaging engine 220 executed by the server 210A, the private shared subscriptions hubs 260C may connect to the messaging engine 220 executed by the server 210B and the private shared subscriptions hubs 260D may connect to the messaging engine 220 executed by the server 210L. That way all the relevant servers 210 are covered by the shared subscriptions clients 240D1, 240D2 and 240D3 of the subscription group 250D.

The private shared subscriptions hubs 260, for example, the private shared subscriptions hubs 260B, 260C and/or 260D may not directly communicate with each other in order to coordinate their connections to the servers 210. However the private shared subscriptions hubs 260B, 260C and/or 260D may use the shared subscription information available through the shared subscriptions information system topics to achieve high server coverage for the subscription group 250D. Since the private shared subscriptions hubs 260B, 260C and/or 260D may use the same shared subscriptions information, they may apply one or more random processes to select the preferred server(s) 210 to connect to. The random processes may serve to avoid or at least significantly reduce the probability that two or more of the private shared subscriptions hubs 260B, 260C and/or 260D connect to the same server 210.

As shown in the system 400, the private shared subscriptions hubs 260E, 260F, 260G and/or 260H, for example, may each connect to a subset of the servers 210 on behalf of the subscription group 250E. In some scenarios two or more of the private shared subscriptions hubs 260E, 260F, 260G and/or 260H may connect to the same server 210, for example, the private shared subscriptions hubs 260G and 260H both connect to the server 210L. This may take place, for example, in case the message load is heavier at the server 210L due, for example, to a large number of publishing clients 230 connected to the server 210L, a large number of topics (subscribed for by the subscription group 250E) available at the server 210L, and/or the like. By connecting got the server 210L, the private shared subscriptions hubs 260G and 260H may convey the messages received from the messaging engine 220 at the server 210L to both the shared subscriptions clients 240E3 and 240E4 thus increasing the message consumption of the distributed subscriptions client employing the subscription group 250E.

Due to the high server coverage provided by the private shared subscription hub(s) 260, the load balancing of the message consumption by the shared subscription group(s) 250 may typically be high.

Figure 5:
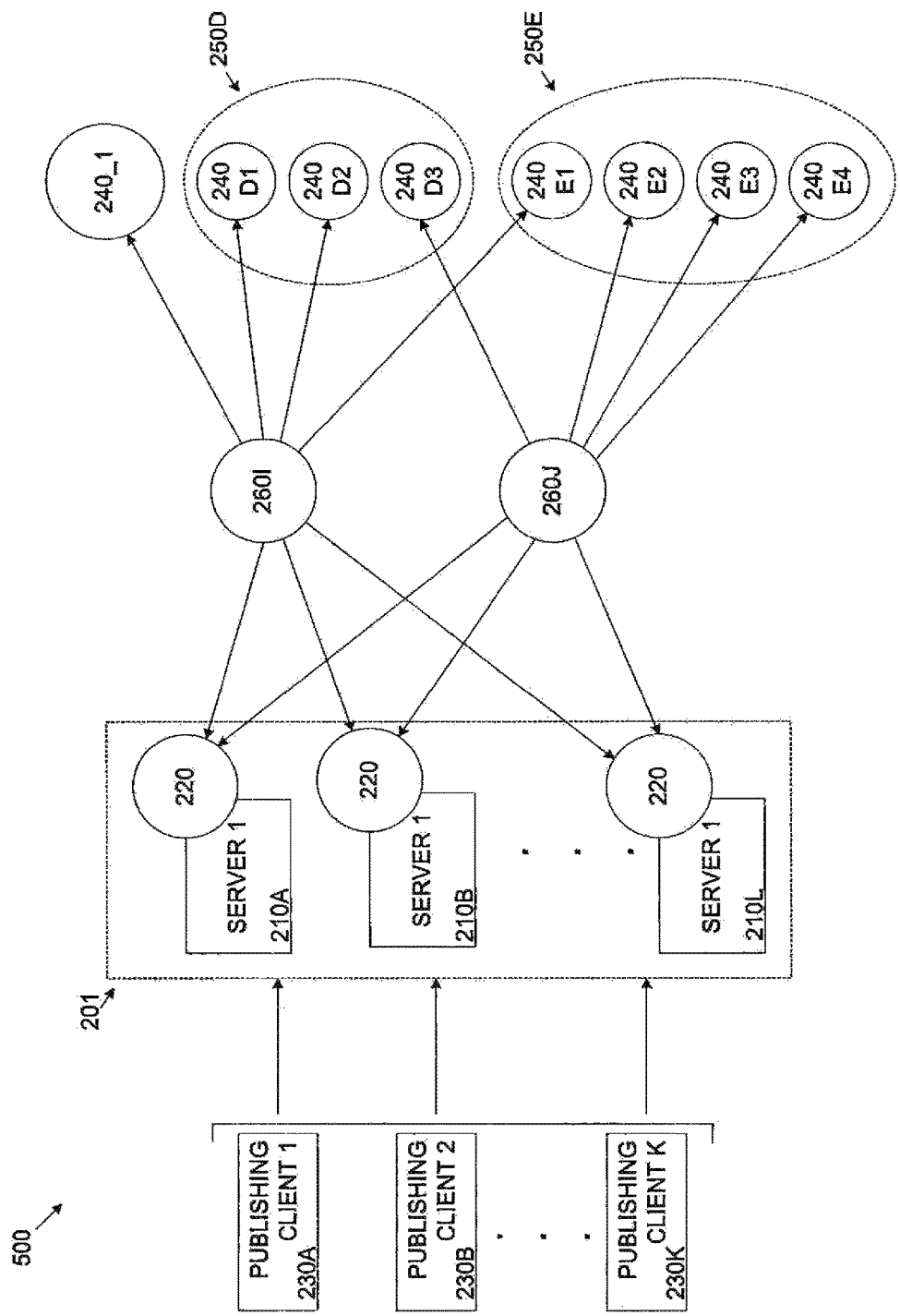
FIG. 5 is a schematic illustration of an exemplary system for applying central shared subscription hubs to intermediate delivery of messages to a plurality of shared subscription clients, according to some embodiments of the present invention.

Reference is now made to FIG. 5, which is a schematic illustration of an exemplary system for applying central shared subscription hubs to intermediate delivery of messages to a plurality of shared subscription clients, according to some embodiments of the present invention. A system 500 includes a publish-subscribe cluster such as the publish-subscribe cluster 201 comprising L servers 210 such as the servers 210A through 210L each executing one or more messaging engines such as the messaging engines 220 for forwarding messages published by a plurality of publishing clients such as the publishing clients 230 to a plurality of subscribing clients such as the subscribing clients 240. Some of the subscribing clients 240 are members of subscription groups, for example, a subscription group such as the subscription group 250D and a subscription group such as the subscription group 250E that may be applied by one or more distributed subscriptions clients, for example, a handling application, in particular a fat pipe application for shared subscription for one or more topics available at the publish-subscribe cluster 201.

In the central hub configuration, a plurality of the subscribing client 240 including the shared subscriptions clients 240 may be assigned with a central shared subscriptions hub 260. For example, the subscribing client 240_1, the shared subscriptions client 240D1, the shared subscriptions client 240D2 and the shared subscriptions client 240E1 are assigned with a central shared subscription hub 260G. The shared subscriptions client 240D3, the shared subscriptions client 240E2, the shared subscriptions client 240E3 and the shared subscriptions client 240E4, for example, are assigned with a central shared subscription hub 260H.

Since the central shared subscription hub 260, for example, the central shared subscription hub 260 serves a plurality of shared subscription clients 240 of a respective subscription group 250, the central shared subscription hub 260 may have the view and/or knowledge of the connections made to the servers 210 on behalf of the plurality of shared subscription clients 240. Moreover, the central shared subscription hub 260 may store information of previous subscriptions indicating which of the shared subscription clients 240 is a member of which of the subscription groups 250. Using this knowledge, the central shared subscription hub 260 may easily direct the connections to the servers 210 to increase the server coverage of the respective subscription group and/or distributed subscriptions client. For example, the central shared subscription hub 260H serving the shared subscriptions clients 240E2, 240E3 and 240E4 may distribute their connections over the servers 210, for example, the server 210A, 210B and 210L to increase the server coverage of the subscription group 250E.

Reference is now made to FIG. 6, which is a schematic illustration of an exemplary system for applying dedicated shared subscription hubs to intermediate delivery of messages to a plurality of shared subscription clients, according to some embodiments of the present invention. A system 600 includes a publish-subscribe cluster such as the publish-subscribe cluster 201 comprising L servers 210 such as the servers 210A through 210L each executing one or more messaging engines such as the messaging engines 220 for forwarding messages published by a plurality of publishing clients such as the publishing clients 230 to a plurality of subscribing clients such as the subscribing clients 240. Some of the subscribing clients 240 are members of subscription groups, for example, a subscription group such as the subscription group 250D and a subscription group such as the subscription group 250E that may be applied by one or more distributed subscriptions clients, for example, a handling application, in particular a fat pipe application for shared subscription for one or more topics available at the publish-subscribe cluster 201.

In the dedicated hub configuration, one or more dedicated shared subscriptions hubs 260 may be assigned to one or more specific groups of subscribing clients 240, for example, a respective one of the subscription groups 250, a respective distributed subscriptions client and/or the like. The dedicated hub configuration may be viewed as a variant between the private hub configuration and the central hub configuration. For example, a subscribing client 240_1 (which is not a shared subscription client) may be assigned with a dedicated shared subscription hub 260K that may practically be regarded as a private shared subscription hub 260 such as the private shared subscription hub 260A. However, a subscription group, for example, the subscription group 250D may be assigned with a dedicated shared subscriptions hub 260L such that the dedicated shared subscriptions hub 260L serves the shared subscriptions clients 240D1-240D3. Similarly, the subscription group 250E, for example, may be assigned with a dedicated shared subscriptions hub 260M such that the dedicated shared subscriptions hub 260M serves the shared subscriptions clients 240E1-240E4.

The dedicated shared subscription hub 260 may take further advantage of the further take advantage of the view, knowledge and/or previous knowledge of the connections made to the servers 210 on behalf of the plurality of shared subscription clients 240 of a respective subscription group and/or a respective distributed subscriptions client since the dedicated shared subscription hub 260 serves all the shared subscription clients 240 of the group. Using this knowledge, the central shared subscription hub 260 may easily direct the connections to the servers 210 to increase the server coverage of the respective subscription group and/or distributed subscriptions client. For example, the dedicated shared subscription hub 260L serving the shared subscriptions clients 240D1, 240D2 and 240D3 may distribute their connections over the servers 210, for example, the server 210A, 210B and 210L to increase the server coverage of the subscription group 250D. Similarly, the dedicated shared subscription hub 260M serving the shared subscriptions clients 240E1, 240E2, 240E3 and 240E4 may distribute their connections over the servers 210, for example, the server 210A, 210B and 210L to increase the server coverage of the subscription group 250E.

In some embodiments of the present invention, the private, central and/or dedicated configurations of the shared subscriptions hubs 260 may be combined. For example, a dedicated shared subscriptions hub 260, for example, the shared subscriptions hub 260K may be assigned for one of the subscription groups 250, for example, the subscription group 250E while a central shared subscriptions hub 260, for example, the shared subscriptions hub 260 260G is assigned for all other subscribing clients 240, for example, the subscribing client 240_1 and/or the shared subscriptions clients 240D1, 240D2 and/or 240D3.

Optionally, the shared subscriptions hub(s) 260 (in any of the private, central and/or dedicated configurations) may establish additional connections to one or more messaging engine(s) 220 on one or more additional servers 210 on behalf of one or more of the shared subscriptions clients 240. This may be of benefit, for example, in case the number of the shared subscriptions clients 240 of one of the subscription groups 250 is smaller than the number of the servers 210. In such case the shared subscriptions hub(s) 260 serving the respective subscription group 250 may connect to additional server(s) 210 in order to increase the server coverage of the respective subscription group 250 and/or the respective distributed subscriptions client. For example, in the system 400, the private shared subscriptions hub 260A may establish a plurality of connections to the servers 210 on behalf of the subscribing client 240_1.

Forwarding the messages received from the plurality of servers 210 to a non-shared subscribing client 240 (e.g. the subscribing client 240_1) may not present a problem. However, forwarding messages received from the plurality of servers 210 to a plurality of shared subscriptions clients 240 may in some scenarios present a major problem. For example, assuming the shared subscriptions hub 260 established more connections to the servers 210 than there are shared subscriptions clients 240 in a respective subscription group 250. In such case the messages received from two or more servers 210 may need to be combined (multiplexed) into a single message stream forwarded to a respective shared subscription client 240.

Reference is now made to FIG. 7A and FIG. 7B, which are schematic illustrations of an exemplary system for applying messages multiplexing in shared subscription hubs, according to some embodiments of the present invention. An exemplary publish-subscribe system 700 includes a publish-subscribe cluster such as the cluster 201 comprising one or more servers, for example, a server 210A, a server 210B and a server 210C such as the server 210 each executing one or more messaging engines such as the messaging engine 220. The messaging engines 220 forward a plurality of messages M, for example, M1, M2, M3, M4, M5, M6, M7, M8, M9, M10, M11 and/or M12 published by a plurality of publishing clients such as the publishing clients 230k to a distributed subscriptions client employing a subscription group 250F such as the subscription group 250 comprising two shared subscriptions clients, 240F1 and 240F2. The subscription group 250F is served by a shared subscriptions hub such as the shared subscriptions hub 260 (in one of the private, central and/or dedicated configurations). The messages M1-M12 are all associated with a topic the distributed subscriptions client is subscribed for and are therefore forwarded by the messaging engine 220 to the shared subscriptions clients 240F1 and 240F2. Since the subscription group includes the shared subscriptions clients, 240F1 and 240F2 the shared subscriptions hub 260 may establish two connections to the publish-subscribe cluster 201, for example, to the messaging engines 220 executed by the server 210A and the server 210B. as shown at FIG. 7A, the messages may be alternately forwarded to the shared subscriptions clients 240F1 and 240F2, for example, the messages M1, M3, M5, M7, M9 and M11 may be forwarded to the shared subscriptions clients 240F1 while the messages M2, M4, M6, M8, M10 and M12 may be forwarded to the shared subscriptions clients 240F2. However, the server 210C that may have messages published by locally connected publishing clients 230, for example, the messages, M4, M8 and M12. These messages (M4, M8 and M12) may need to be transferred from the server 210C to the server 210B in order to be forwarded to the shared subscriptions clients 240F2 served by the shared subscription hub 260 connected to the server 210B on behalf of the shared subscriptions clients 240F2.

As shown at FIG. 7B, in order to avoid and/or reduce the message transfer between the server 210C and the server 210B, the shared subscription hub 260 may establish a new connection to the messaging engine 220 executed by the server 210C. By doing so, the shared subscription hub 260 may improve the server coverage of the subscription group 250F thus increase efficiency of the publish-subscribe cluster 201 by reducing network traffic (messages transfer) between the servers 210B and 210C. In order to verify proper delivery and order of delivery of the messages originating from the two servers 210B and 210C to the shared subscriptions client 240F2, the shared subscription hub 260 may need to multiplex the messages M2, M4, M6, M8, M10 and M12. The delivery and/or the message ordering of the messages M to the shared subscriptions clients 240, the shared subscription hub 260 may maintain a routing map and/or a messages sequence numbering defining one or more messages multiplexing and/or forwarding rules and/or directives. The messages sequence numbering may be applies by the shared subscription hub 260 to change the messages numbering such that, for example, messages received from different servers 210 have mutually exclusive message numbers while messages received from the same server 210 may preserve their message numbers.

The multiplexing rules may be created and/or adjusted by the shared subscription hub 260 according to the detected shared subscriptions made by shared subscription clients of each subscription group 250, for example, the subscription group 250F to each of the servers 210, for example, the servers 210A-210C. The messaging engine(s) 220 may detect the shared subscriptions by analyzing the unique identification (ID) assigned to each of the subscribing clients 240. Based on the multiplexing rules, the shared subscription hub 260 may properly generate the message stream to the shared subscriptions client(s) 240, for example, the shared subscriptions client 240F2 that combines the messages M2, M6 and M10 received from the server 210B and the messages M4, M8 and M12 received from the server 210C.

Optionally, the shared subscriptions hub(s) 260 may divert connections to one or more servers 210 on behalf of one or more of the shared subscriptions clients 240 according to analysis of one or more of the shared subscription information system topics. The shared subscriptions hub(s) 260 may divert the connections according to one or more conditions detected by analyzing the shared subscription information, for example, the SharedSubCoverage, the AppCoverage, the SharedSubLoad and/or the like.

For example, in case one or more shared subscriptions clients 240 of one of the subscription groups 250 fails, the respective shared subscriptions hub(s) 260 may divert one or more connections of the shared subscriptions clients 240. For example, in a system such as the system 400, assuming the shared subscriptions client 240E2 fails, the server coverage of the subscription group 250E is reduced since the server 210B is no longer covered. In order to improve the server coverage of the subscription group 250E, the shared subscriptions hub(s) 260G may divert its connection from the server 210L to the messaging engine 220 executed by the server 210B. In another exemplary scenario in the system 400, the shared subscriptions client 240D3 fails thus reducing the server coverage of the subscription group 250D since the server 210L is no longer covered. The shared subscriptions hub(s) 260C, for example, may establish a new connection to the messaging engine 220 executed by the server 220L in order to regain the server coverage and forward messages received from the server 210L to the shared subscriptions client 240D2.

As another example, by analyzing the shared subscriptions information provided through the SharedSubLoad system topic, one or more of the shared subscriptions hub(s) 260 may detect a load condition on one or more of the servers 210 for one or more of the subscription groups 250 and/or the distributed subscriptions clients. For example, in a system such as the system 400, one or more of the shared subscriptions hub(s) 260 may divert one or more connections of the shared subscriptions clients 240 according to analysis of the messages load at the messaging engine(s) 220 executed by one or more of the servers 210. For example, the shared subscriptions hub(s) 260G serving the shared subscriptions client 240E3, may detect a load (e.g. a long queue) of messages of the subscribed topic(s) at the server 210A. The shared subscriptions hub(s) 260G may divert its connection from the server 210L to the messaging engine 220 executed by the server 210A such that both the shared subscriptions clients 240E1 and 204E3 consume messages published at the server 210A. In this exemplary scenario the server coverage of the subscription group 250E is not affected since the same servers 210 are covered as before only the way the distribution is made is changed.

Reference is made once again to FIG. 1 and FIG. 2. The process 100 may be applied by the shared subscription hub(s) 260 for any of the various configuration embodiments of the shared subscriptions hub(s) 260, i.e. the private hub, the central hub, the dedicated hub and a combination thereof.

As shown at 110, after connecting to the selected server(s) 220 and subscribing to the respective messaging engine(s) 220 on behalf of the shared subscriptions clients 240, the shared subscriptions hub(s) 260 may convey the messages received from the messaging engine(s) 220 to the shared subscriptions client(s) 240 according to their subscription(s).

It is expected that during the life of a patent maturing from this application many relevant publish-subscribe methodologies will be developed and the scope of the term publish-subscribe is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A computer implemented method of improving server coverage of a publish-subscribe cluster using shared subscriptions hubs for intermediating shared subscription clients subscribing to said cluster, comprising:
    using at least one hardware processor to execute at least one shared subscriptions hub, each adapted to:
        retrieve a shared subscriptions information from a cluster comprising a plurality of servers executing a plurality of messaging engines of a publish-subscribe service for forwarding a plurality of messages to a plurality of subscribing clients, each of said plurality of messages is associated with at least one of a plurality of topics;
        receive a plurality of shared subscriptions requests for subscribing for at least one of said plurality of topics from at least one distributed subscriptions client applying shared subscriptions for said at least one topic through at least one subscription group comprising a subset of said plurality of subscribing clients;
        wherein said shared subscriptions information comprises at least one of a cluster membership information indicating which of said plurality of servers is a member of said cluster and a sub-name subscription information indicating a number of current subscriptions of said at least one subscription group to each of said plurality of messaging engines for each of said plurality of topics;
        select at least one preferred messaging engine of said plurality of messaging engines, based on said shared subscriptions information, by analyzing said shared subscriptions information to identify a candidate messaging engine having a coverage performance over said at least one subscription group, higher than said coverage by each of other messaging engines in said cluster;
        connect to said selected at least one preferred messaging engine to serve each of said plurality of shared subscriptions requests; and
        forward messages associated with said at least one topic received from said at least one selected messaging engine to said at least one subscription group;
    wherein said at least one preferred messaging engine is selected to improve a server coverage of said at least one subscription group.

2. The computer implemented method of claim 1, wherein each of said plurality of messages is received by said cluster from at least one source which is a member selected from a group consisting of: a device and a publishing application.

3. The computer implemented method of claim 1, wherein said at least one distributed subscriptions client subscribes to said publish-subscribe service through said at least one subscription group to increase a message consumption of said at least one distributed subscriptions client.

4. The computer implemented method of claim 1, wherein said at least one distributed subscriptions client is a fat pipe application consuming a large number of said plurality of messages.

5. The computer implemented method of claim 1, wherein each subscribing client of said at least one subscription group is an application instance of said at least one distributed subscriptions client.

6. The computer implemented method of claim 1, wherein said publish-subscribe service supports subscription using a wildcard topic filter in which only a portion of at least one of said plurality of topics may be used by at least one of said subscribing clients to subscribe to a plurality of topics sharing said portion.

7. The computer implemented method of claim 1, wherein said at least one shared subscriptions hub emulates a functional interface of said publish-subscribe cluster to allow each of said plurality of subscribing clients to subscribe to said at least one shared subscriptions hub.

8. The computer implemented method of claim 1, wherein said at least one shared subscriptions hub uses a functional interface used by each said plurality of subscribing clients to connect to said at least one selected messaging engine.

9. The computer implemented method of claim 1, wherein said publish-subscribe service is an MQTI (Message Queue Telemetry Transport) used for a plurality of Internet of Things (IoT) applications.

10. The computer implemented method of claim 1, wherein said shared subscriptions information further comprises
an application identification information indicating an application name of said at least one distributed subscriptions client.

11. The computer implemented method of claim 1, wherein said at least one shared subscriptions hub is configured in at least one of a plurality of configurations for serving said plurality of subscribing clients, in particular said subscription group, said configuration is a member of a group consisting of: a private shared subscriptions hub, a dedicated shared subscriptions hub, a central shared subscriptions hub and a combination of at least two configurations thereof.

12. The computer implemented method of claim 11, wherein said private shared subscriptions is assigned to serve privately each of said plurality of clients.

13. The computer implemented method of claim 11, wherein said dedicated shared subscriptions hub is assigned to serve exclusively said at least one subscription group.

14. The computer implemented method of claim 11, wherein said central shared subscriptions hub is assigned to serve at least a subset of said plurality of subscribing clients regardless of an of an association of said subset with said at least one subscription group.

15. The computer implemented method of claim 1, further comprising said at least one shared subscriptions hub establishes at least one additional subscription connection for at least one client of said at least one subscription group with at least one of said messaging engines,
wherein said at least one shared subscriptions hub establishes said at least one additional subscription connection in case a number of clients of said at least one shared subscription group is smaller than a number of said plurality of servers that are members of said cluster.

16. The computer implemented method of claim 15, further comprising said at least one shared subscriptions hub multiplexes messages received through said at least one additional subscription connection with a message stream received thorough at least one originally directed subscription connection of said at least one subscription group.

17. The computer implemented method of claim 1, wherein said coverage reflects a distribution of the plurality of shared subscriptions over the plurality of servers of the cluster.

18. The computer implemented method of claim 1, wherein improving said server coverage of said at least one subscription group is by lowering a latency of said forwarding of said messages associated with said at least one topic.

19. A publish-subscribe system, comprising:
a cluster comprising a plurality of servers executing a plurality of messaging engines of a publish-subscribe service for forwarding a plurality of messages to a plurality of subscribing clients, each of said plurality of messages is associated with at least one of a plurality of topics;
at least one hardware processor adapted for executing at least one shared subscriptions hub by executing code stored in a program store, said code comprising:
code instructions for retrieving a shared subscriptions information from said cluster,
code instructions for receiving a plurality of shared subscription requests for subscribing for at least one of said plurality of topics from at least one distributed subscriptions client applying shared subscriptions for said at least one topic through at least one subscription group comprising a subset of said plurality of subscribing clients, wherein said shared subscriptions information comprises at least one of a cluster membership information indicating which of said plurality of servers is a member of said cluster and a sub-name subscription information indicating a number of current subscriptions of said at least one subscription group to each of said plurality of messaging engines for each of said plurality of topics;
code instructions for selecting at least one preferred messaging engine of said plurality of messaging engines, based on said shared subscriptions information, by analyzing said shared subscriptions information to identify a candidate messaging engine having a coverage performance over said at least one subscription group, higher than said coverage by each of other messaging engines in said cluster;
code instructions to connect to said selected at least one preferred messaging engine to serve each of said plurality of shared subscriptions requests; and
code instructions for forwarding messages associated with said at least one topic received from said at least one selected messaging engine to said at least one subscription group;
wherein said at least one preferred messaging engine is selected to improve a server coverage of said at least one subscription group.

20. A computer program product for improving server coverage of a publish-subscribe cluster using shared subscriptions hubs for intermediating shared subscription clients subscribing to said cluster, comprising:
a non-transitory computer readable storage medium;
first program instructions to retrieve a shared subscriptions information from a cluster comprising a plurality of servers executing a plurality of messaging engines of a publish-subscribe service for forwarding a plurality of messages to a plurality of subscribing clients, each of said plurality of messages is associated with at least one of a plurality of topics;

second program instructions to receive a plurality of shared subscription requests for at least one of said plurality of topics from at least one distributed subscriptions client applying shared subscriptions through at least one subscription group comprising a subset of said plurality of subscribing clients, wherein said shared subscriptions information comprises at least one of a cluster membership information indicating which of said plurality of servers is a member of said cluster and a sub-name subscription information indicating a number of current subscriptions of said at least one subscription group to each of said plurality of messaging engines for each of said plurality of topics;

third program instructions to select at least one preferred messaging engine of said plurality of messaging engines, based on said shared subscriptions information, by analyzing said shared subscriptions information to identify a candidate messaging engine having a coverage performance over said at least one subscription group, higher than said coverage by each of other messaging engines in said cluster;

fourth program instructions to connect to said selected at least one preferred messaging engine to serve each of said plurality of shared subscriptions requests; and fifth program instructions to forward messages associated with said at least one topic received from said at least one selected messaging engine to said at least one subscription group;

wherein said at least one preferred messaging engine is selected to improve a server coverage of said at least one subscription group, and wherein said first, second, third, fourth and fifth program instructions are executed by at least one processor from said non-transitory computer readable storage medium.

* * * * *